US011558139B2

(12) United States Patent
Sun

(10) Patent No.: US 11,558,139 B2
(45) Date of Patent: Jan. 17, 2023

(54) APPARATUS AND METHOD FOR REDUCTION IN INTERFERENCE IN A WIRELESS COMMUNICATION SYSTEM INCLUDING PRIMARY AND SECONDARY COMMUNICATION SYSTEMS

(71) Applicant: Sony Corporation, Tokyo (JP)

(72) Inventor: Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 174 days.

(21) Appl. No.: 16/937,611

(22) Filed: Jul. 24, 2020

(65) Prior Publication Data
US 2020/0358545 A1 Nov. 12, 2020

Related U.S. Application Data

(60) Division of application No. 15/683,830, filed on Aug. 23, 2017, now Pat. No. 10,784,977, which is a (Continued)

(30) Foreign Application Priority Data

Apr. 19, 2013 (CN) .......................... 201310138168.4

(51) Int. Cl.
*H04J 11/00* (2006.01)
*H04W 16/14* (2009.01)
(Continued)

(52) U.S. Cl.
CPC ......... *H04J 11/0053* (2013.01); *H04W 16/14* (2013.01); *H04W 72/0453* (2013.01); *H04W 72/082* (2013.01); *H04W 24/02* (2013.01)

(58) Field of Classification Search
None
See application file for complete search history.

(56) References Cited

U.S. PATENT DOCUMENTS 8,060,104 B2 * 11/2011 Chaudhri .............. H04W 16/14
455/450
9,018,910 B2 * 4/2015 Kim ...................... H02J 7/0026
320/128
(Continued)

FOREIGN PATENT DOCUMENTS

CN 101940019 A 1/2011
CN 102469462 A 5/2012
(Continued)

OTHER PUBLICATIONS

International Search Report and Written Opinion of the International Searching Authority dated Jun. 27, 2014 in PCT/CN14/074289, filed Mar. 28, 2014.

*Primary Examiner* — Faiyazkhan Ghafoerkhan
(74) *Attorney, Agent, or Firm* — Xsensus LLP

(57) ABSTRACT

A spectrum management system includes circuitry that obtains interference information from another spectrum management system, where the interference information indicates interference with communication of a communication system managed by the other spectrum management system. The interference is caused by at least one secondary communication system managed by the spectrum management system. The circuitry also modifies a communication characteristic of the at least one secondary communication system based on the interference information.

12 Claims, 24 Drawing Sheets

Related U.S. Application Data continuation of application No. 14/781,222, filed as application No. PCT/CN2014/074289 on Mar. 28, 2014, now abandoned.

(51) Int. Cl.
  *H04W 72/04* (2009.01)
  *H04W 72/08* (2009.01)
  *H04W 24/02* (2009.01)

(56) References Cited

U.S. PATENT DOCUMENTS

| | | | |
|---|---|---|---|
| 9,019,910 B2 | 4/2015 | Kang | |
| 2007/0280175 A1 | 12/2007 | Cheng et al. | |
| 2009/0233544 A1 | 9/2009 | Oyman et al. | |
| 2009/0298522 A1* | 12/2009 | Chaudhri | H04W 52/367 455/69 |
| 2010/0081441 A1 | 4/2010 | Tao et al. | |
| 2010/0142471 A1 | 6/2010 | Cheng et al. | |
| 2010/0317391 A1* | 12/2010 | Mody | H04W 16/14 455/512 |
| 2011/0199957 A1 | 8/2011 | Oyman et al. | |
| 2011/0211618 A1 | 9/2011 | Oyman et al. | |
| 2011/0275322 A1* | 11/2011 | Sawai | H04W 72/085 455/41.2 |
| 2012/0122467 A1 | 5/2012 | Auer et al. | |
| 2012/0157144 A1* | 6/2012 | Stanforth | H04W 16/14 455/512 |
| 2012/0201208 A1* | 8/2012 | Kang | H04W 16/14 370/329 |
| 2012/0236736 A1* | 9/2012 | Frank | H04W 24/04 370/252 |
| 2014/0243009 A1* | 8/2014 | Nekovee | H04W 16/14 455/454 |
| 2014/0307565 A1* | 10/2014 | Samarasooriya | H04B 17/345 370/252 |
| 2015/0011233 A1* | 1/2015 | Kazmi | H04W 72/044 455/454 |
| 2015/0038139 A1* | 2/2015 | Chun | H04W 60/00 455/435.1 |
| 2015/0043338 A1* | 2/2015 | Yi | H04L 41/0816 370/230 |
| 2016/0056908 A1* | 2/2016 | Sun | H04W 72/0453 370/329 |
| 2017/0353261 A1* | 12/2017 | Sun | H04W 16/14 |
| 2020/0358545 A1* | 11/2020 | Sun | H04W 16/14 |

FOREIGN PATENT DOCUMENTS

| | | |
|---|---|---|
| EP | 2 101 528 A1 | 9/2009 |
| WO | WO-2012025788 A1 | 3/2012 |

* cited by examiner

APPARATUS AND METHOD FOR REDUCTION IN INTERFERENCE IN A WIRELESS COMMUNICATION SYSTEM INCLUDING PRIMARY AND SECONDARY COMMUNICATION SYSTEMS

CROSS-REFERENCE TO RELATED APPLICATIONS

The present application is a divisional of U.S. application Ser. No. 15/683,830, filed Aug. 23, 2017, which is a continuation of U.S. application Ser. No. 14/781,222, filed Sep. 29, 2015, which is a National Stage Entry of PCT/CN14/74289, filed Mar. 28, 2014, and claims priority to CN 201310138168.4, filed Apr. 19, 2013; the entire contents of each of which are incorporated herein by reference.

FIELD OF THE INVENTION

The present invention generally relates to the field of wireless communications and in particular to an apparatus and method in a wireless transmission system including primary systems and secondary systems.

BACKGROUND OF THE INVENTION

There have been constantly growing service demands of users for high-quality, high-speed and new services along with evolution of wireless communication systems. Wireless communication operators and apparatus manufacturers need to constantly improve the systems so as to accommodate the demands of the users. This necessitates a huge amount of spectrum resources (for example, which can be quantified as per time, frequency, bandwidth, tolerable maximum transmission power and other parameters) to support the new services and satisfy the demand for high-speed communication. There are very limited spectrum resources which have been allocated to fixed operators and services and new available spectrums which are either rather scare or prohibitively expensive.

In view of this, the concept of dynamic spectrum use has been proposed, that is, dynamic use of those spectrum resources which have been allocated to some services but have been underused. For example, spectrums of some channels over which no programs are played, or spectrums of adjacent channels, among digital television and radio spectrums are used dynamically for wireless mobile communication without interference to reception of television signals. In this application example, the digital television and radio spectrums themselves are allocated to television and radio systems for use, so the television and radio systems are a primary system, and television sets are a primary user. Moreover mobile communication system is a secondary system, and receiver in the mobile communication system is a secondary user. The primary system mentioned here may refer to the system with a spectrum access, e.g., a television and radio system; and the secondary system may refer to a system without spectrum access except for appropriate use of a spectrum possessed by the primary system only when the spectrum is not used by the primary system.

Moreover the primary system and the secondary system can alternatively be systems both with a spectrum access but at different spectrum access priorities. For example, when an operator deploys a new base station to provide a new service, there is a spectrum access priority for an existing base station and a service provided by the existing base station. A primary system is composed of a primary user base station and a primary user, and a secondary system is composed of a secondary user base station and a secondary user. The secondary user base station communicates with one or more secondary users or a plurality of secondary users communicate with each other to constitute a secondary system. A plurality of secondary systems can be assigned to a cluster of secondary systems in some region. For example, a cluster of secondary systems can include a plurality of wireless local networks.

This communication solution with coexistence of the primary system and the secondary system requires that the secondary system be applied without interference to an application of the primary system or an influence as a result of spectrum use by the secondary system be controlled within a range tolerated by the primary system.

One of predominant solutions at present to protection of a primary system is to store coverage information of the primary system in a database together with an interference limit tolerable to the primary system. Prior to use of a spectrum of the primary system in the same region, a secondary system in the same region firstly accesses the database and submits information of the secondary system, e.g., position information, a spectrum emission mask, a transmission bandwidth, a carrier frequency, etc. Then the database calculates maximum transmission power, a bandwidth, etc., of the secondary system tolerated by the primary system without interference thereto according to the maximum interference tolerance limit of the primary system, the distance between the primary system and the secondary system in the same region, etc.

SUMMARY OF THE INVENTION

However in the background art, primary systems and secondary systems in respective regions are managed by different databases, that is, the primary systems and the secondary systems in respective regions are stored in the different databases. Since an available spectrum of a secondary system may be calculated differently in different databases, when a secondary system at the edge of a different region transmits over an available spectrum resource provided by a database of its own region, there may be interference to a communication system such as primary system, unregistered in the present database, in another adjacent region. In another aspect, the database calculates the available spectrum resource for the secondary system it manages without knowing the interference from secondary systems registered in another database. Therefore, if the secondary system uses the calculated available spectrum resource, it might still cause harmful interference to the primary system managed by the database. In view of this, the applicants thus have made the invention. With the invention, interference of secondary systems in a region to a communication system such as primary system in another adjacent region can be prevented to thereby make reasonable use of spectrum resources.

According to an exemplary aspect, a spectrum management system includes circuitry that obtains interference information from another spectrum management system, where the interference information indicates interference with communication of a communication system managed by the other spectrum management system. The interference is caused by at least one secondary communication system managed by the spectrum management system. The circuitry also modifies a communication characteristic of the at least one secondary communication system based on the interference information.

According to another exemplary aspect, a spectrum management system includes circuitry that identifies interference with communication of a communication system managed by the spectrum management system, where the interference originates from at least one secondary communication system managed by another spectrum management system. The circuitry also generates interference information based on the identified interference, and provides the interference information to the other spectrum management system.

According to a further exemplary aspect, a method for a spectrum management system includes obtaining, using circuitry of the spectrum management system, interference information from another spectrum management system indicating interference with communication of a communication system managed by the other spectrum management system. The interference is caused by at least one secondary management system managed by the spectrum management system. The method also includes modifying a communication characteristic of the at least one secondary communication system based on the interference information.

Of course, it can be appreciated that the above method can be included in a non-transitory computer-readable medium as a computer-readable instructions that, when executed by a computer cause the computer to perform the method.

According to a still further exemplary aspect, a method for a spectrum management system includes identifying, with circuitry of the spectrum management system, interference with communication of a communication system managed by the spectrum management system. The interference originates from a secondary communication system managed by another spectrum management system. The method also includes generating interference information based on the identified interference, and providing the interference information to the other spectrum management system.

Of course, it can be appreciated that the above method can be included in a non-transitory computer-readable medium as a computer-readable instructions that, when executed by a computer cause the computer to perform the method.

Additional exemplary aspect of the advancements described herein are set forth below. While illustrative, these descriptions should not be read as limiting on the inventive features defined by the claims.

According to another exemplary aspect, there is provided an apparatus in a wireless communication system, the apparatus including: a receiving unit for receiving, from at least some of one or more second regions, reference information for modifying usage spectrum information of secondary systems in a first region, wherein the at least some of the one or more second regions are regions in which primary systems are judged, according to the usage spectrum information of the secondary systems in the first region, as being subjected to interference of the secondary systems in the first region; and a managing unit for modifying the usage spectrum information of the secondary systems in the first region according to the received reference information.

In the apparatus, the usage spectrum information includes at least one of actual usage spectrum information and available spectrum information, the available usage spectrum information of the secondary systems in the first region being determined according to geographical position information of the secondary systems in the first region and service range information of a primary system in the first region.

In the apparatus, the spectrum use information of the secondary systems in the first region includes at least one of frequency bands, bandwidths, transmission power and spectrum use time.

In the apparatus, the reference information includes at least one of: service range information of primary systems, in the one or more second regions, subjected to interference of the secondary systems in the first region, and secondary-system-related information of the secondary systems which interfere with the primary systems in the one or more second regions.

In the apparatus, the spectrum use information of the secondary systems in the first region is modified according to operating condition information of the primary systems, in the one or more second regions, subjected to interference of the secondary systems in the first region, so that the secondary systems in the first region will not interfere with the primary systems in the one or more second regions, wherein the primary systems, in the one or more second regions, subjected to interference of the secondary systems in the first region, are determined according to the service range information of the primary systems in the one or more second regions as well as first level interference range information of the secondary systems in the first region, which is determined based on the spectrum use information of the secondary systems in the first region.

In the apparatus, the at least some of the one or more second regions are regions in which primary systems are judged, according to the spectrum use information of the secondary systems in the first region as well as the spectrum use information of the other secondary systems in the first region and/or the secondary systems in the one or more second regions, as being subjected to aggregated interference of the secondary systems in the first region.

In the apparatus, the spectrum use information of the secondary systems in the first region is modified according to the operating condition information of the primary systems, in the one or more second regions, subjected to the aggregated interference of the secondary systems in the first region as well as interference condition information of the secondary systems which interfere with the primary systems, in the one or more second regions, subjected to the aggregated interference of the secondary systems in the first region, so that the secondary systems in the first region will not produce aggregated interference to the primary systems in the one or more second regions, wherein the primary systems, in the one or more second regions, subjected to the aggregated interference of the secondary systems in the first region, are determined according to the service range information of the primary systems in the one or more second regions as well as second level interference range information of the secondary systems in the first region, which is determined based on the spectrum use information of the secondary systems in the first region.

In the apparatus, the interference condition information of the secondary systems which interfere with the primary systems, in the one or more second regions, subjected to the aggregated interference of the secondary systems in the first region, is obtained by inquiring about interference condition information, recorded in a registering unit in the second region, to which different positions within a service range of the primary system in the second region are subjected from secondary systems in the second region and from secondary systems in other regions.

In the apparatus, the interference condition information from the secondary systems in the second region includes interference amounts of the secondary systems in the second region to the primary system in the second region and/or spectrum utilization time of the secondary systems in the second region, and the interference condition information from the secondary systems in the other regions includes region identifiers of the other regions and secondary system identifiers of the secondary systems in the other regions.

In the apparatus, the managing unit further includes: a secondary system spectrum use time determining unit for determining spectrum use valid time of the secondary systems in the first region according to a spectrum use time limit of the primary system in the first region and spectrum use time limits of the primary systems, in the one or more second regions, subjected to interference of the secondary systems in the first region.

In the apparatus, the receiving unit is further adapted to receive, from the secondary systems in the first region, secondary system spectrum use durations estimated by the secondary systems in the first region; and the secondary system spectrum use time determining unit is further adapted to modify the spectrum use time of the secondary systems in the first region according to the spectrum use valid time of the secondary systems determined by the secondary system spectrum use time determining unit and the secondary system spectrum use durations.

In the apparatus, the secondary system spectrum use durations are estimated according to the spectrum use information of the secondary systems in the first region and application types of the secondary systems in the first region.

The apparatus further includes: a registering unit for recording interference condition information to which different positions within a service range of the primary system in the first region are subjected from the secondary systems in the first region and from secondary systems in other regions.

in the apparatus, the interference condition information from the secondary systems in the first region includes interference amounts of the secondary systems in the first region to the primary system in the first region and/or spectrum use time of the secondary systems in the first region, and the interference condition information from the secondary systems in the other regions includes region identifiers of the other regions and secondary system identifiers of the secondary systems in the other regions.

in the apparatus, the first region further transmits a region identifier of the first region and secondary system identifiers of the secondary systems in the first region to the one or more second regions.

The apparatus further includes: a storing unit for storing descriptions of transmission masks of secondary systems in the first region and the one or more second regions and corresponding identifiers thereof.

The apparatus further include: a converting unit for converting the identifiers of the transmission masks of secondary systems from the one or more second regions into descriptions of corresponding transmission masks of secondary systems according to the descriptions of the transmission masks or frequency bands of secondary systems in the one or more second regions and the corresponding identifiers thereof, which are stored in the storing unit.

According to another exemplary aspect, there is provided a method for use in a wireless communication system, the method including: a receiving step of receiving, from at least some of one or more second regions, reference information for modifying spectrum use information of secondary systems in a first region, wherein the at least some of the one or more second regions are regions in which primary systems are judged, according to the spectrum use information of the secondary systems in the first region, as being subjected to interference of the secondary systems in the first region; and a managing step of modifying the spectrum use information of the secondary systems in the first region according to the received reference information.

According to still another exemplary aspect, there is provided an apparatus in a wireless communication system, the apparatus including: an acquiring unit for acquiring spectrum use information of secondary systems in a first region; a managing unit for judging, according to the spectrum use information of the secondary systems in the first region, whether the secondary systems in the first region interfere with a primary system in a second region; and a transmitting unit for transmitting reference information for modifying the spectrum use information of the secondary systems in the first region to the first region in the case that the secondary systems in the first region interfere with the primary system in the second region.

In the apparatus, the reference information includes at least one of: service range information of the primary system, in the second region, subjected to interference of the secondary systems in the first region, and secondary-system-related information of the secondary systems which interfere with the primary system in the second region.

In the apparatus, the primary system, in the second region, subjected to the interference of the secondary systems in the first region is searched for according to the service range information of the primary system in the second region as well as first level interference range information of the secondary systems in the first region, which is determined based on the spectrum use information of the secondary systems in the first region, wherein the spectrum use information of the secondary systems in the first region is modified according to operating condition information of the primary system, in the second region, subjected to interference of the secondary systems in the first region, so that the secondary systems in the first region will not interfere with the primary system in the second region.

In the apparatus, it is judged, according to the spectrum use information of the secondary systems in the first region as well as spectrum use information of other secondary systems in the first region and/or secondary systems in one or more second regions, whether the secondary systems in the first region produce aggregated interference to the primary system in the second region.

In the apparatus, the primary system, in the second region, subjected to aggregated interference of the secondary systems in the first region is searched for according to the service range information of the primary system in the second region as well as second level interference range information of the secondary systems in the first region, which is determined based on the spectrum use information of the secondary systems in the first region, wherein the spectrum use information of the secondary systems in the first region is modified according to operating condition information of the primary system, in the second region, subjected to aggregated interference of the secondary systems in the first region as well as interference condition information of secondary systems which interfere with the primary system, in the second region, subjected to aggregated interference of the secondary systems in the first region, so that the secondary systems in the first region will not produce aggregated interference to the primary system in the second region.

In the apparatus, the interference condition information of the secondary systems which interfere with the primary system, in the second region, subjected to aggregated interference of the secondary systems in the first region, is obtained by inquiring about interference condition information, recorded in a registering unit in the second region, to which different positions within a service range of the primary system in the second region are subjected from secondary systems in the second region and from secondary systems in other regions.

In the apparatus, the interference condition information from the secondary systems in the second region includes interference amounts of the secondary systems in the second region to the primary system in the second region and/or spectrum use time of the secondary systems in the second region, and the interference condition information from the secondary systems in the other regions includes region identifiers of the other regions and secondary system identifiers of the secondary systems in the other regions.

In the apparatus, the acquiring unit further acquires a region identifier of the first region and secondary system identifiers of the secondary systems in the first region.

The apparatus further includes: a registering unit for recording interference condition information to which different positions within a service range of the primary system in the second region are subjected from the secondary systems in the second region and from secondary systems in other regions.

In the apparatus, the interference condition information from the secondary systems in the second region includes interference amounts of the secondary systems in the second region to the primary system in the second region and/or spectrum use time of the secondary systems in the second region, and the interference condition information from the secondary systems in the other regions includes region identifiers of the other regions and secondary system identifiers of the secondary systems in the other regions.

The apparatus further includes: a storing unit for storing descriptions of transmission masks of secondary system in the first region and the second region and corresponding identifiers thereof.

According to still another exemplary aspect, there is provided a method in a wireless communication system, the method including: an acquiring step of acquiring spectrum use information of secondary systems in a first region; a managing step of judging, according to the spectrum use information of the secondary systems in the first region, whether the secondary systems in the first region interfere with a primary system in a second region; and a transmitting step of transmitting reference information for modifying the spectrum use information of the secondary systems in the first region to the first region in the case that the secondary systems in the first region interfere with the primary system in the second region.

According to still another exemplary aspect, there is provided an apparatus in a wireless communication system, the apparatus including: a receiving unit for receiving, from a first region, spectrum use information of secondary systems in the first region, which is modified according to reference information, wherein the reference information is received by the first region from at least some of one or more second regions, and the at least some of the one or more second regions are regions in which primary systems are judged, according to the spectrum use information of the secondary systems in the first region, as being subjected to interference of the secondary systems in the first region; and an executing unit for communicating with user equipments of the secondary systems in the first region according to the modified spectrum use information of secondary systems in the first region.

The apparatus further includes: a secondary system spectrum use duration estimating unit for estimating secondary system spectrum use durations according to the spectrum use information of the secondary systems in the first region and application types of the secondary systems in the first region.

The apparatus further includes: a transmitting unit for transmitting the estimated secondary system spectrum use durations to the first region.

The apparatus further includes: a secondary system spectrum use time modifying unit for modifying spectrum use of the secondary systems in the first region according to changes in spectrum use conditions of the primary system and the secondary systems in the first region within the secondary system spectrum use durations or spectrum available time limits.

According to still another exemplary aspect, there is provided a method in a wireless communication system, the method including: a receiving step of receiving, from a first region, spectrum use information of secondary systems in the first region, which is modified according to reference information, wherein the reference information is received by the first region from at least some of the one or more second regions, and the at least some of the one or more second regions are regions in which primary systems are judged, according to the spectrum use information of the secondary systems in the first region, as being subjected to interference of the secondary systems in the first region; and an executing step of communicating with user equipments of the secondary systems in the first region according to the modified spectrum use information of secondary systems in the first region.

According to still another exemplary aspect, there is provided a computer storage medium including computer readable instructions adapted to cause a computer performs: a receiving step of receiving, from at least some of one or more second regions, reference information for modifying spectrum use information of secondary systems in a first region, wherein the at least some of the one or more second regions are regions in which primary systems are judged, according to the spectrum use information of the secondary systems in the first region, as being subjected to interference of the secondary systems in the first region; and a managing step of modifying the spectrum use information of the secondary systems in the first region according to the received reference information.

According to still another exemplary aspect, there is provided a computer storage medium including computer readable instructions adapted to cause a computer performs: a receiving step of receiving, from a first region, spectrum use information of secondary systems in the first region; a managing step of judging, according to the spectrum use information of the secondary systems in the first region, whether the secondary systems in the first region interfere with a primary system in a second region; and a transmitting step of transmitting reference information for modifying the spectrum use information of the secondary systems in the first region to the first region in the case that the secondary systems in the first region interfere with the primary system in the second region.

According to still another exemplary aspect, there is provided a computer storage medium including computer readable instructions adapted to cause a computer performs: a receiving step of receiving, from a first region, spectrum use information of secondary systems in the first region, which is modified according to reference information, wherein the reference information is received by the first region from at least some of one or more second regions, and the at least some of the one or more second regions are regions in which primary systems are judged, according to the spectrum use information of the secondary systems in the first region, as being subjected to interference of the secondary systems in the first region; and an executing step of communicating with user equipments of the secondary systems in the first region according to the modified spectrum use information of secondary systems in the first region.

With the invention, at least interference of secondary systems in a region to a communication system such as primary system in another adjacent region can be prevented to thereby make reasonable use of spectrum resources.

BRIEF DESCRIPTION OF THE DRAWINGS

The foregoing and other objects, features and advantages of the invention can be understood more easily from the following description of embodiments of the invention with reference to the drawings in which identical or corresponding technical features or components will be denoted with identical or corresponding reference numerals.

DETAILED DESCRIPTION OF THE INVENTION

Figure 1:
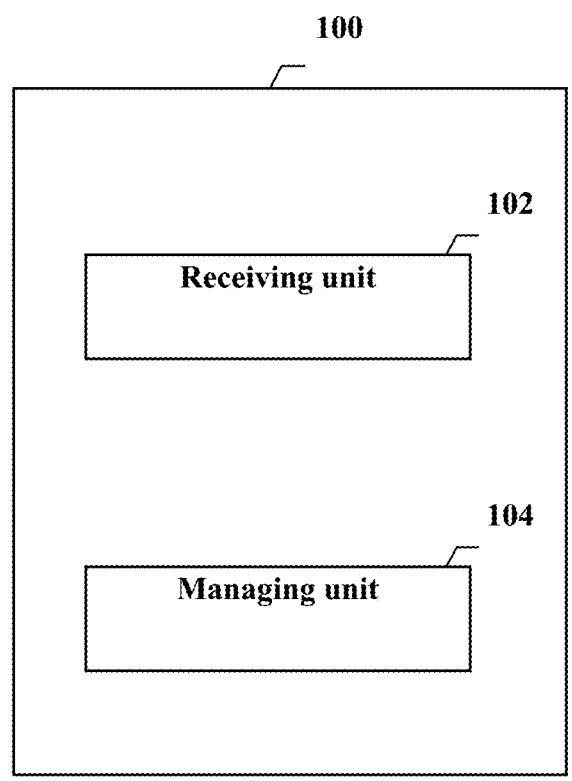
FIG. 1 is a block diagram illustrating a configuration of an apparatus in a wireless communication system according to an embodiment of the invention.

Embodiments of the invention will be described below with reference to the drawings. It shall be noted that an illustration and a description of components and processes, well known to those ordinarily skilled in the art, of no irrelevance to the invention have been omitted in the drawings and the description for the sake of clarity.

A configuration of an apparatus in a wireless communication system according to an embodiment of the invention will be described below with reference to FIG. 1. FIG. 1 is a block diagram illustrating a configuration of an apparatus in a wireless communication system according to an embodiment of the invention.

As illustrated in FIG. 1, the apparatus 100 in a wireless communication system can include a receiving unit 102 and a managing unit 104.

According to a particular embodiment, a first region can transmit spectrum use information of secondary systems in the first region to one or more second regions. Moreover according to a particular embodiment, one or more second regions can detect spectrum use information of secondary systems in the first region. For example, a second region can collect signal measurement results at different positions in a coverage range of the second region and detect the spectrum use information of the secondary systems in the first region according to the signal measurement results.

Figure 2:
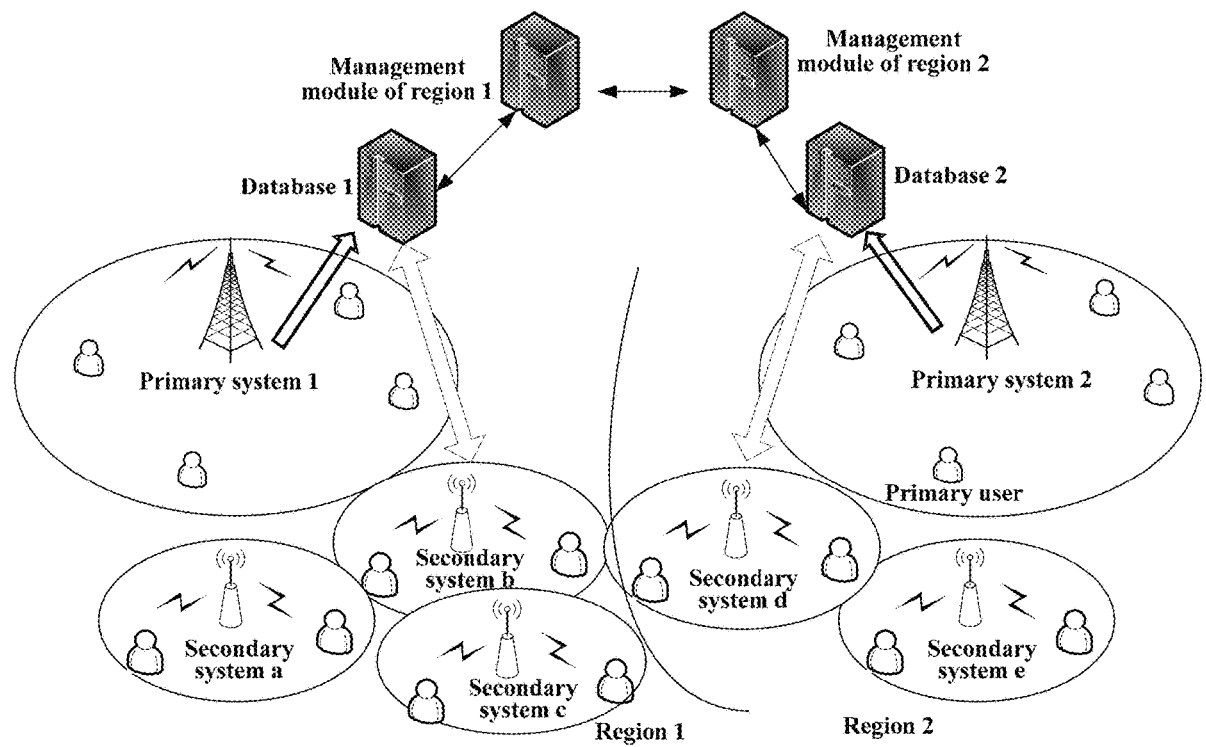
FIG. 2 is a schematic diagram illustrating that spectrum use information of secondary systems is modified according to first level interference ranges of the secondary systems according to an embodiment of the invention.

As illustrated in FIG. 2, a region 1 illustrated on the left of FIG. 2 includes a primary system 1 and three secondary systems a, b and c, and a region 2 illustrated on the right of FIG. 2 includes a primary system 2 and two secondary systems e and d. The secondary systems a, b and c in the region 1 can use spectrum resources of the primary system 1 in the region 1 according to spectrum resources recorded in a database 1. The secondary systems e and d in the region 2 can use spectrum resources of the primary system 2 in the region 2 according to spectrum resources recorded in a database 2. Those skilled in the art shall appreciate that the regions 1 and 2 are merely exemplary, and the number of regions can be any number but will not be limited to two illustrated in FIG. 2; and the secondary systems a, b and c in the region 1 and the secondary systems e and d in the region 2 are merely exemplary, and the number of secondary systems in the same region can be any number but will not be limited to three or two illustrated in FIG. 2; and moreover the primary system 1 in the region 1 and the primary system 2 in the region 2 are merely exemplary, and the number of primary systems in the same region can be any number but will not be limited to one illustrated in FIG. 2. In a particular embodiment of the invention, the primary system can be a television and radio system, and a secondary system can be a Wireless Local Area Network (WLAN) system, and the different regions can correspond to different countries or regions.

As described above, when a secondary system at the edge of a different region transmits over an available spectrum resource provided by a database of its own region, there may be interference to a primary system, unregistered in the present database, in another adjacent region. For example, as illustrated in FIG. 2, when the secondary systems a, h and c in the region 1 transmit according to the spectrum resources recorded in the database 1, there may be interference to the primary system 2 in the region 2. In another example, when the secondary systems d and e in the region 2 transmit according to the spectrum resources recorded in the database 2, there may be interference to the primary system 1 in the region 1. Moreover when the secondary systems a, b and c in the region 1 transmit according to the spectrum resources recorded in the database 1, and the secondary systems d and e in the region 2 transmit according to the spectrum resources recorded in the database 2, the secondary systems a, b and c in the region 1 and the secondary systems d and e in the region 2 may produce aggregated interference to the primary system 1 in the region 1 and the primary system 2 in the region 2, and the produced aggregated interference may exceed anti-interference thresholds of the primary system 1 in the region 1 and the primary system 2 in the region 2. It should be noted that in the example each region corresponds to a spectrum management system. So, for example, the secondary system in region N can be regarded as the secondary system managed by spectrum management system N.

With regard to interference of secondary systems in a region to a primary system in another region, the region where the secondary systems are located can be referred to as a first region, and all the other regions than the region where the secondary systems are located can be referred to as a second region. For example, in the example illustrated in FIG. 2, with regard to interference of the secondary systems a, b and c in the region 1 to the primary system 2 in the region 2, the region 1 where the secondary systems a, b and c are located can be referred to as a first region, and the other region 2 than the region 1 where the secondary systems a, b and c are located can be referred to as a second region. In another example, with regard to interference of the secondary systems d and e in the region 2 to the primary system 1 in the region 1, the region 2 where the secondary systems d and e are located can be referred to as a first region, and the other region 1 than the region 2 where the secondary systems d and e are located can be referred to as a second region. Those skilled in the art shall appreciate that the number of second regions can be one or more.

According to an embodiment of the invention, the spectrum use information includes at least one of actual spectrum use information and available spectrum information, where the available spectrum information of the secondary systems in the first region is determined according to geographical position information of the secondary systems in the first region and service range information of the primary system in the first region to thereby ensure no interference to the primary system in the first region.

The available spectrum information of the secondary systems in the first region includes maximum transmission power, bandwidths, etc., of the secondary systems in the first region, which are allowed in the case that the secondary systems doe not interfere with the primary system in the first region. Due to path fading of wireless signal transmission, the available spectrum information of the secondary systems in the first region may be influenced by the distances between the secondary systems and the primary system in the first region and other factors. The distances between the secondary systems and the primary system in the first region, etc., can be determined according to the geographical position information of the secondary systems in the first region and the service range information of the primary system in the first region. Thus the available spectrum information of the secondary systems in the first region can be determined according to the determined distances between the secondary systems and the primary system in the first region, etc. For example, in the example illustrated in FIG. 2, available spectrum information of the secondary system a in the region 1 can be determined according to geographical position information of the secondary system a in the region 1 and service range information of the primary system 1 in the region 1 to thereby ensure no interference to the primary system 1 in the region 1. In another example, available spectrum information of the secondary system d in the region 2 can be determined according to geographical position information of the secondary system d in the region 2 and service range information of the primary system 2 in the region 2 to thereby ensure no interference to the primary system 2 in the region 2. Moreover spectrum use valid time of the secondary systems in the first region can also be determined as available spectrum information according to a use plan of the spectrum resources by the primary system in the first region.

Those skilled in the art shall appreciate that the foregoing spectrum use information can be available spectrum information of secondary systems in a region or can be actual spectrum use information of the secondary systems in the region or can include both of them. Spectrum resources actually used by secondary systems in a region can be a part or all of available spectrum resources, for example, when there is a sudden change in operating condition of a primary system in the region, the spectrum resources actually used by the secondary systems in the region may alternatively be different from the available spectrum resources. According to an embodiment of the invention, the spectrum use information of the secondary systems in the first region includes at least one of frequency bands, bandwidths, transmission power and spectrum use time. Particularly the available spectrum use information of the secondary systems in the first region includes at least one of available frequency bands, available bandwidths, maximum transmission power and spectrum valid use time. Moreover those skilled in the art shall appreciate that the foregoing spectrum use information is merely exemplary but not exhaustive.

As illustrated in FIG. 1, the receiving unit 102 in the apparatus 100 can receive, from at least some of one or more second regions, reference information for modifying spectrum use information of secondary systems in a first region, where the at least some of the one or more second regions are regions in which primary systems are judged, according to the spectrum use information of the secondary systems in the first region, as being subjected to interference of the secondary systems in the first region.

After the first region transmits the spectrum use information of the secondary systems in the first region to the one or more second regions, the one or more second regions can receive the spectrum use information of the secondary systems in the first region; or the one or more second regions can detect spectrum use information of the secondary systems in the first region. A second region can judge whether the secondary systems in the first region interfere with a primary system in the second region according to the received or detected spectrum use information of the secondary systems in the first region. If the second region judges that the secondary systems in the first region may interfere with the primary system in the second region according to the received or detected spectrum use information of the secondary systems in the first region, then the second region can transmit reference information for modifying the spectrum use information of the secondary systems in the first region to the first region. Moreover if the second region judges that the secondary systems in the first region will not interfere with the primary system in the second region according to the received or detected spectrum use information of the secondary systems in the first region, then interference of the secondary systems in the first region can be taken into account without regard to the second region, so the second region may not perform any action. In the case that the second region transmits the reference information for modifying the spectrum use information of the secondary systems in the first region to the first region, the first region can receive the reference information. The modified spectrum use information of the secondary systems in the first region includes transmission power, bandwidths, frequency bands, etc., of the secondary systems in the first region without interference to the primary systems in the first region and the second region, for example, can be tolerated maximum transmission power, bandwidths, etc., of the secondary systems.

For example, in the example illustrated in FIG. 2, when the region 1 transmits spectrum use information of the secondary system b in the region 1 to the region 2, the region 2 receives the spectrum use information of the secondary system b in the region 1; or the region 2 can detect spectrum use information of the secondary system b in the region 1. The region 2 can judge whether the secondary system b in the region 1 interferes with the primary system 2 in the region 2 according to the spectrum use information of the secondary system b in the region 1. If the region 2 judges that the secondary system b in the region 1 may interfere with the primary system 2 in the region 2, then the region 2 transmits reference information for modifying the spectrum use information of the secondary system b in the region 1 to the region 1. If the region 2 judges that the secondary system b in the region 1 will not interfere with the primary system 2 in the region 2, then interference of the secondary system b in the region 1 can be taken into account without regard to the region 2, so the region 2 may not perform any action. In the case that the region 2 transmits the reference information for modifying the spectrum use information of the secondary system b in the region 1 to the region 1, the region 1 can receive the reference information.

Similarly, in the example illustrated in FIG. 2, when the region 2 transmits spectrum use information of the secondary system d in the region 2 to the region 1, the region 1 receives the spectrum use information of the secondary system d in the region 2; or the region 1 can detect spectrum use information of the secondary system d in the region 2. The region 1 can judge whether the secondary system d in the region 2 interferes with the primary system 1 in the region 1 according to the spectrum use information of the secondary system d in the region 2. If the region 1 judges that the secondary system d in the region 2 may interfere with the primary system 1 in the region 1, then the region 1 transmits reference information for modifying the spectrum use information of the secondary system d in the region 2 to the region 2. If the region 1 judges that the secondary system d in the region 2 will not interfere with the primary system 1 in the region 1, then interference of the secondary system d in the region 2 can be taken into account without regard to the region 1, so the region 1 may not perform any action. In the case that the region 1 transmits the reference information for modifying the spectrum use information of the secondary system d in the region 2 to the region 2, the region 2 can receive the reference information.

According to an embodiment of the invention, the reference information includes at least one of: service range information of primary systems, in the one or more second regions, subjected to interference of the secondary systems in the first region, and secondary-system-related information of the secondary systems which interfere with primary systems in the one or more second regions. It should be noted that the reference information indicates interference that is caused by the secondary systems on communication of a communication system such as primary system managed by different spectrum management system. This feature may also be referred to as interference information in the descriptions made herein.

As described above, the modified spectrum use information of the secondary systems in the first region includes transmission power, bandwidths, frequency bands, etc., of the secondary systems in the first region without interference to the primary systems in the first region and the second region. Due to path fading of wireless signal transmission, the spectrum use information of the secondary systems in the first region may be influenced by the distances between the secondary systems in the first region and the primary system in the second region and other factors. The distances between the secondary systems in the first region and the primary system in the second region, etc., can be determined according to the geographical position information of the secondary systems in the first region and the service range information of the primary system in the second region. Thus transmission power, bandwidths, frequency bands, etc., of the secondary systems in the first region without interference to the primary systems in the first region and the second region can be determined according to the determined distances between the secondary systems in the first region and the primary system in the second region, etc.

Thus the service range information of the primary systems, in the one or more second regions, subjected to interference of the secondary systems in the first region can be taken as the reference information for modifying the spectrum use information of the secondary systems in the first region. For example, in the example illustrated in FIG. 2, in the case the primary system 2 in the region 2 is subjected to interference of the secondary system a in the region 1, spectrum use information of the secondary system a in the region 1 can be determined according to geographical position information of the secondary system a in the region 1 and the service range information of the primary system 2 in the region 2, so the service range information of the primary system 2, in the region 2, subjected to interference of the secondary system a in the region 1 can be taken as reference information for modifying the spectrum use information of the secondary system a in the region 1. In another example in the case the primary system 1 in the region 1 is subjected to interference of the secondary system d in the region 2, the spectrum use information of the secondary system d in the region 2 can be determined according to geographical position information of the secondary system d in the region 2 and service range information of the primary system 1 in the region 1, so the service range information of the primary system 1, in the region 1, subjected to interference of the secondary system d in the region 2 can be taken as reference information for modifying the spectrum use information of the secondary system d in the region 2.

Since the apparatus 100 in a wireless communication system may manage a plurality of secondary systems, the secondary-system-related information of the secondary systems which interfere with the primary systems in the one or more second regions can be taken as the reference information for modifying the spectrum use information of the secondary systems in the first region to facilitate management by the apparatus 100. For example, the secondary-system-related information can be secondary system identifiers or the spectrum use information of the secondary systems. In this case, spectrum use information of the secondary systems which interfere with the primary systems in the one or more second regions can be inquired about according to the secondary system identifiers of the secondary systems which interfere with the primary systems in the one or more second regions, or spectrum use information of the secondary systems which interfere with the primary systems in the one or more second regions can be obtained directly, so that the spectrum use information of the secondary systems in the first region can be modified according to the spectrum use information of the secondary systems. Moreover in the case that the secondary systems in the first region produce aggregated interference to a primary system in a second region together with secondary systems in the one or more second regions, the spectrum use information of the secondary systems in the first region need to be further determined taking into account which secondary systems in which second regions will produce aggregated interference to a primary system in the second region together with the secondary systems in the first region. In this case, spectrum use information of these secondary systems in these second regions which will produce aggregated interference to the primary system in the second region together with the secondary systems in the first region can be inquired about according to secondary system identifiers of these secondary systems in these second regions which will produce aggregated interference to the primary system in the second region together with the secondary systems in the first region, or spectrum use information of these secondary systems in these second regions which will produce aggregated interference to the primary system in the second region together with the secondary systems in the first region can be obtained directly, so that the spectrum use information of the secondary systems in the first region can be modified according to the spectrum use information of these secondary systems. For example, in the example illustrated in FIG. 2, in the case that the secondary system b in the region 1 produces aggregated interference to the primary system 2 in the region 2 together with the secondary system d in the region 2, the spectrum use information of the secondary system d in the region 2 can be inquired about according to the secondary system identifier d of the secondary system d in the region 2, or the spectrum use information of the secondary system d in the region 2 can be obtained directly, so that the spectrum use information of the secondary system b in the region 1 can be modified according to the spectrum use information of the secondary system d in the region 2. Moreover, in the example illustrated in FIG. 2, if there is a further region 3 including a secondary system f (not illustrated), and the secondary system b in the region 1 produces aggregated interference to the primary system 2 in the region 2 together with the secondary system f in the region 3, then in this case, spectrum use information of the secondary system f in the region 3 can be inquired about according to the secondary system identifier f of the secondary system f in the region 3, or spectrum use information of the secondary system f in the region 3 can be obtained directly, so that the spectrum use information of the secondary system h in the region 1 can be modified according to the spectrum use information of the secondary system f in the region 3. Similarly, in the example illustrated in FIG. 2, in the case that the secondary system d in the region 2 produces aggregated interference to the primary system 1 in the region 1 together with the secondary system b in the region 1, the spectrum use information of the secondary system b in the region 1 can be inquired about according to the secondary system identifier b of the secondary system b in the region 1, or the spectrum use information of the secondary system b in the region 1 can be obtained directly, so that the spectrum use information of the secondary system d in the region 2 can be modified according to the spectrum use information of the secondary system b in the region 1. Moreover, in the example illustrated in FIG. 2, if there is a further region 3 including a secondary system f (not illustrated), and the secondary system d in the region 2 produces aggregated interference to the primary system 1 in the region 1 together with the secondary system f in the region 3, then in this case, spectrum use information of the secondary system f in the region 3 can be inquired about according to the secondary system identifier f of the secondary system f in the region 3, or spectrum use information of the secondary system f in the region 3 can be obtained directly, so that spectrum use information of the secondary system d in the region 2 can be modified according to the spectrum use information of the secondary system f in the region 3.

Referring back to FIG. 1, the managing unit 104 in the apparatus 100 can modify the spectrum use information of the secondary systems in the first region according to the received reference information.

After the first region receives the reference information for modifying the spectrum use information of the secondary systems in the first region from the second region, the first region can modify the spectrum use information of the secondary systems in the first region according to the received reference information, so that the secondary systems in the first region will not interfere with the primary system in the second region. For example, in the example illustrated in FIG. 2, after the region 1 receives reference information for modifying the spectrum use information of the secondary system b in the region 1 from the region 2, the region 1 can modify the spectrum use information of the secondary system b in the region 1 according to the received reference information, so that the secondary system b in the region 1 will not interfere with the primary system 2 in the region 2. In addition, in the example illustrated in FIG. 2, after the region 2 receives reference information for modifying the spectrum use information of the secondary system d in the region 2 from the region 1, the region 2 can modify the spectrum use information of the secondary system d in the region 2 according to the received reference information, so that the secondary system d in the region 2 will not interfere with the primary system 1 in the region 1.

According to an embodiment of the invention, the spectrum use information of the secondary systems in the first region is modified according to operating condition information of the primary systems, in the one or more second regions, subjected to interference of the secondary systems in the first region, so that the secondary systems in the first region will not interfere with the primary systems in the one or more second regions, where the primary systems, in the one or more second regions, subjected to interference of the secondary systems in the first region, are determined according to the service range information of the primary systems in the one or more second regions as well as first level interference range information of the secondary systems in the first region, which is determined based on the spectrum use information of the secondary systems in the first region.

Moreover according to another particular embodiment of the invention, the second region can alternatively determine those secondary systems in the first region which interfere with the primary system in the second region by measuring signals at different positions in the coverage range of the second region. For example, the second region can collect signal measurement results at different positions in the coverage range thereof and can judge that one or more secondary systems at some positions in the first region interfere with the primary system in the second region according to the collected signal measurement results. In this case, the second region can modify spectrum use information of these secondary systems according to operating condition information of the primary system in the second region to ensure that the secondary systems in the first region will not interfere with the primary system in the second region. Moreover the second region can alternatively transmit the operating condition information of the primary system, in the second region, subjected to interference of the secondary systems in the first region to the first region, so that the first region can modify the spectrum use information of the secondary systems in the first region according to the operating condition information of the primary system in the second region.

A process of modifying spectrum use information of secondary systems according to first level interference ranges of the secondary systems according to an embodiment of the invention will be described below with reference to FIG. 2. FIG. 2 is a schematic diagram illustrating that spectrum use information of secondary systems is modified according to first level interference ranges of the secondary systems according to an embodiment of the invention.

After the first region transmits the spectrum use information of the secondary systems in the first region to the second region, the second region determines first level interference ranges of the secondary systems in the first region according to the received spectrum use information of the secondary systems in the first region. A first level interference range is a range in which a primary system in a second region, falling into a circle with a center being a secondary system in the first region and a radius being a first level interference radius $r_1$ can not operate due to interference of the secondary system in the first region. Thus the primary system in the second region can not operate once it falls into the first level interference range. For example, the first level interference radius $r_1$ can be calculated in the formula of:

$$Pt_{ss} - PL(r_1) = Pr_{PS\_min} - PR_{min} \qquad (1)$$

Where $Pt_{ss}$ is transmission power of the secondary system in the first region in a frequency band. $PL(r_1)$ is path fading calculated according to the distance in and a channel model and can be calculated using a corresponding path fading model according to an antenna height of the secondary system in the first region, an antenna height of the primary system in the second region and an application scenario. For details thereof, reference can be made to ECC REPORT 159, "TECHNICAL AND OPERATIONAL REQUIREMENTS FOR THE POSSIBLE OPERATION OF COGNITIVE RADIO SYSTEMS IN THE "WHITE SPACES" OF THE FREQUENCY BAND 470-790 MHz", cardiff, January 2011. $Pr_{PS\_min}$ is the lowest signal strength at the edge of a service area of the primary system in the second region. $PR_{min}$ is the lowest signal-to-interference ratio at which a receiver of the primary system in the second region can operate normally with interference. $Pr_{PS\_min}$ and $PR_{min}$ may vary across the primary systems in the respective regions. For example, the lowest signal strength of edge signal of a television service area may vary across different countries, and also an anti-interference capability of a television signal receiver may vary across the respective countries. Such information may be stored in advance as system information and can be inquired about as necessary. Those skilled in the art can appreciate that the foregoing method of calculating a first level interference radius of a secondary system in the first region is merely exemplary and a first level interference radius of a secondary system in the first region can alternatively be calculated in another appropriate method.

After the first level interference ranges of the secondary systems in the first region are determined, the primary systems in the one or more second regions can be searched for a primary system falling into a first level interference range of a secondary system in the first region according to the determined first level interference ranges of the secondary systems in the first region and the service range information of the primary systems in the one or more second regions. If a primary system in a second region is found falling into a first level interference range of a secondary system in the first region, then the primary system in the second region can be judged as a primary system, in a second region, subjected to interference of the secondary system in the first region.

After the primary systems, in the one or more second regions, subjected to interference to the secondary systems in the first regions are judged, the spectrum use information of the secondary systems in the first regions can be modified according to the operating condition information of the judged primary systems, in the one or more second regions, subjected to interference of the secondary systems in the first regions, so that the secondary systems in the first region will not interfere with the primary systems in the one or more second regions. For example, the operating condition information of the primary system in the second region can include at least one of frequency bands, bandwidths, transmission power, spectrum use time limits, etc.

For example, in the example illustrated in FIG. 2, after the region 1 transmits the spectrum use information of the secondary system b in the region 1 to the region 2, or after the region 2 detects the spectrum use information of the secondary system b in the region 1, the region 2 can determine a first level interference range of the secondary system h in the region 1 according to the spectrum use information of the secondary system h in the region 1. The first level interference range of the secondary system b in the region 1 is a range in which the primary system 2 in the region 2, falling into a circle with a center being the secondary system b in the region 1 and a radius being the first level interference radius $r_1$ can not operate. For example, the first level interference radius $r_1$ of the secondary system b in the region 1 can be calculated in the method described in the formula (1) above. After the first level interference range of the secondary system h in the region 1 is determined, whether the primary system 2 in the region 2 falls into the first level interference range of the secondary system b in the region 1 can be judged according to the determined first level interference range of the secondary system b in the region 1 and the service range information of the primary system 2 in the region 2, etc. If the primary system 2 in the region 2 falls into the first level interference range of the secondary system h in the region 1, then the primary system 2 in the region 2 can be judged as being subjected to interference of the secondary system b in the region 1. After the primary system 2 in the region 2 is judged as being subjected to interference of the secondary system b in the region 1, the spectrum use information of the secondary system h in the region 1 can be modified according to operating condition information of the primary system 2 in the region 2, so that the secondary system b in the region 1 will not interfere with the primary system 2 in the region 2. Moreover interference of the secondary system d in the region 2 to the primary system 1 in the region 1 can be taken into account in a similar way to what described above, and a detailed description thereof will be omitted here.

Figure 3:
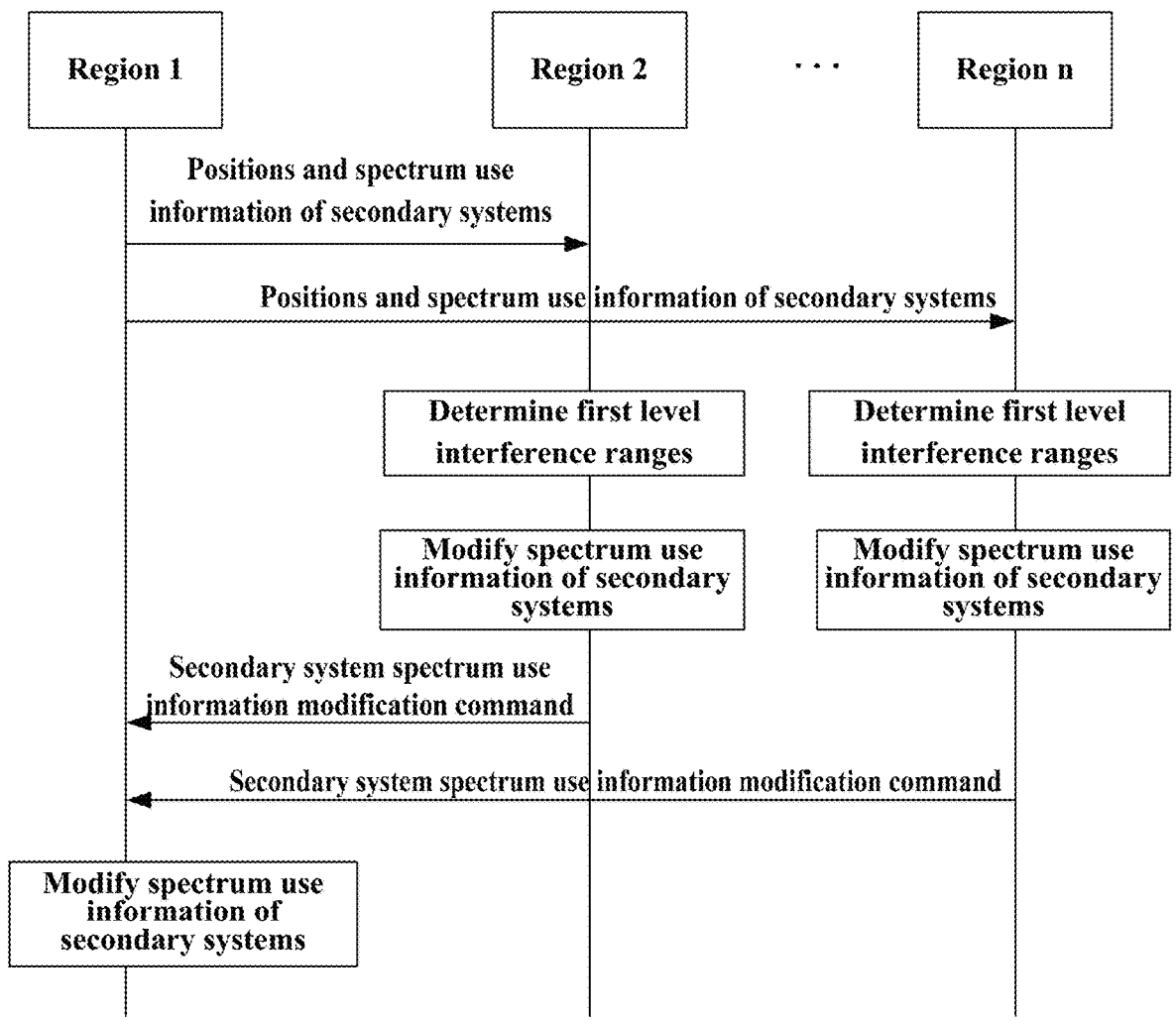
FIG. 3 is a schematic diagram illustrating an implementation in which spectrum use information of secondary systems is modified according to first level interference ranges of the secondary systems according to an embodiment of the invention.

An implementation in which spectrum use information of secondary systems is modified according to first level interference ranges of the secondary systems according to an embodiment of the invention will be described below with reference to FIG. 3. FIG. 3 is a schematic diagram illustrating an implementation in which spectrum use information of secondary systems is modified according to first level interference ranges of the secondary systems according to an embodiment of the invention.

As illustrated in FIG. 3, the first region (the region 1) transmits the position information, the spectrum use information, etc., of the secondary systems in the first region to the one or more second regions (the region 2, the region n). Moreover the one or more second regions (the region 2, . . . , the region n) can alternatively detect the spectrum use information of the first region (the region 1). The respective second regions determine first level interference ranges of the secondary systems in the first region respectively according to the position information and the spectrum use information of the secondary systems in the first region, the service range information of the primary systems in the corresponding second regions, etc. After the respective second regions determine the first level interference ranges of the secondary systems in the first region respectively, the respective second regions can modify the spectrum use information of the secondary systems in the first region respectively according to the operating condition information of the primary systems in the corresponding second regions and transmit the modified spectrum use information of the secondary systems respectively to the first region in a secondary system spectrum use information modification command. The first region modifies synthetically the spectrum use information of the secondary systems in the first region upon reception of the modified spectrum use information of the secondary systems transmitted from the respective second regions, so that the secondary systems in the first region will not interfere with the primary systems in the respective second regions.

Figure 4:
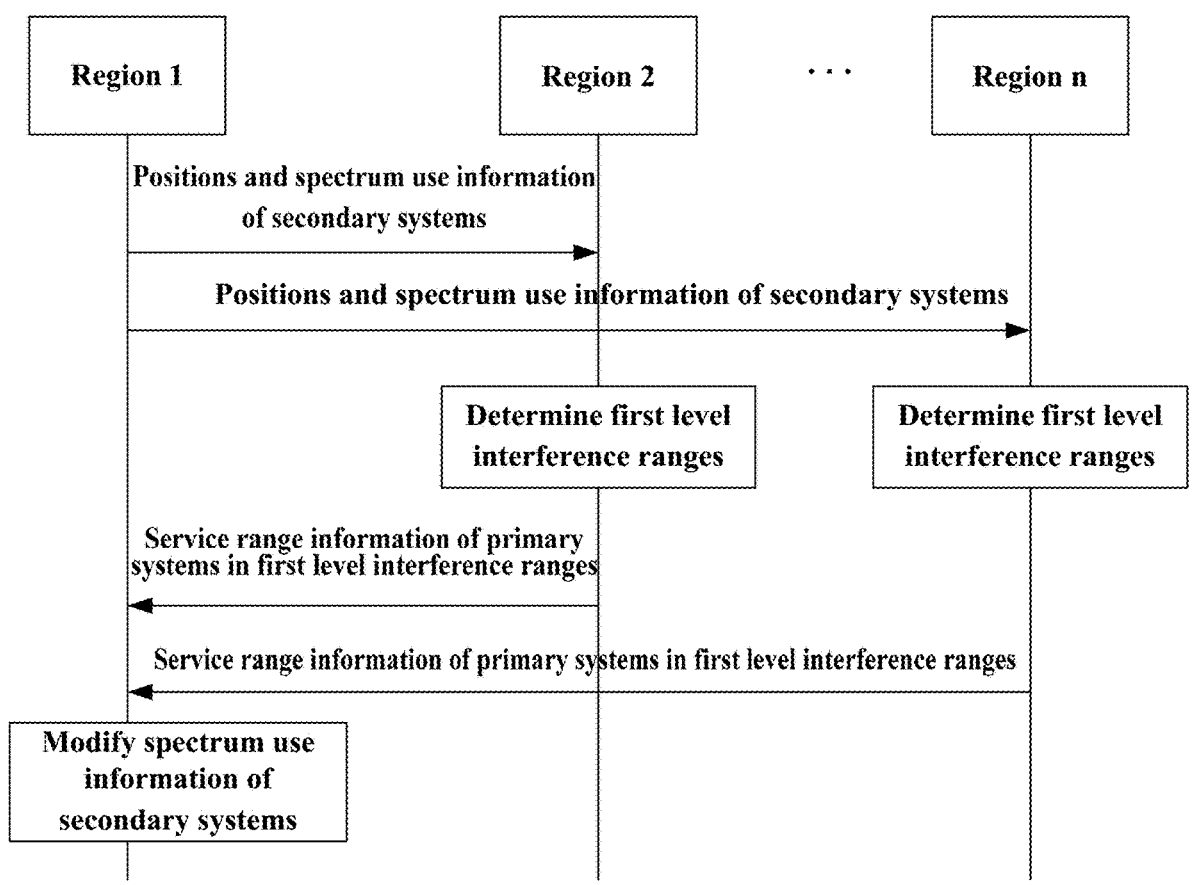
FIG. 4 is a schematic diagram illustrating another implementation in which spectrum use information of secondary systems is modified according to first level interference ranges of the secondary systems according to an embodiment of the invention.

Another implementation in which spectrum use information of secondary systems is modified according to first level interference ranges of the secondary systems according to an embodiment of the invention will be described below with reference to FIG. 4. FIG. 4 is a schematic diagram illustrating another implementation in which spectrum use information of secondary systems is modified according to first level interference ranges of the secondary systems according to an embodiment of the invention.

As illustrated in FIG. 4, the first region (the region 1) transmits the position information, the spectrum use information, etc., of the secondary systems in the first region to the one or more second regions (the region 2, . . . , the region n). Moreover the one or more second regions (the region 2, . . . , the region n) can alternatively detect the spectrum use information of the first region (the region 1). The respective second regions determine first level interference ranges of the secondary systems in the first region respectively according to the position information and the spectrum use information of the secondary systems in the first region, the service range information of the primary systems in the corresponding second regions, etc. After the respective second regions determine the first level interference ranges of the secondary systems in the first region respectively, the primary systems in the respective second regions are searched for primary systems in the respective second regions, falling into the first level interference ranges of the secondary systems in the first region, and the service range information of the primary systems in the respective second regions, falling into the first level interference ranges of the secondary systems in the first region is transmitted respectively to the first region. The first region modifies synthetically the spectrum use information of the secondary systems in the first region upon reception of the service range information of the primary systems in the respective second regions, falling into the first level interference ranges of the secondary systems in the first region, transmitted from the respective second regions, so that the secondary systems in the first region will not interfere with the primary systems in the respective second regions.

According to an embodiment of the invention, the at least some of the one or more second regions are regions in which primary systems are judged, according to the spectrum use information of the secondary systems in the first region as well as the spectrum use information of the other secondary systems in the first region and/or the secondary systems in the one or more second regions, as being subjected to aggregated interference of the secondary systems in the first region.

Figure 5:
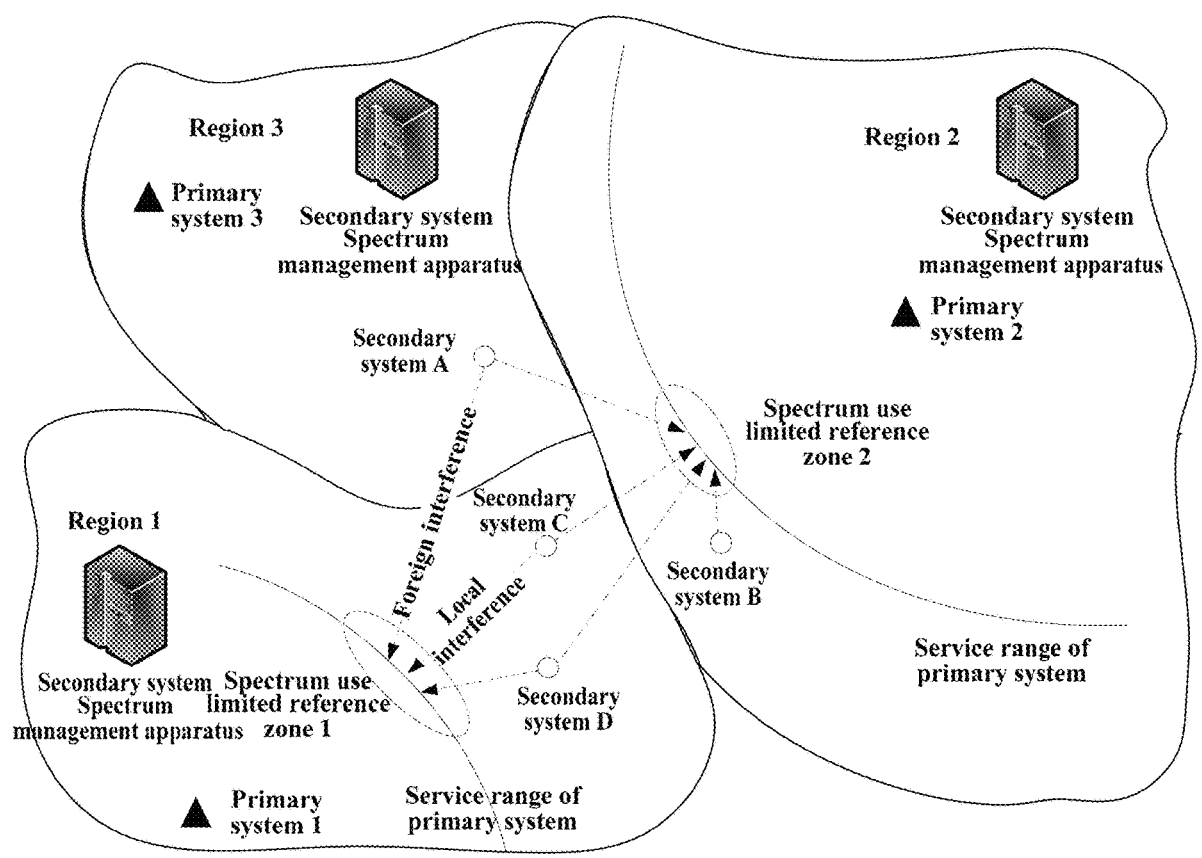
FIG. 5 is a schematic diagram illustrating that spectrum use information of secondary systems is modified according to second level interference ranges of the secondary systems according to an embodiment of the invention.

A process of modifying spectrum use information of secondary systems according to second level interference ranges of the secondary systems according to an embodiment of the invention will be described below with reference to FIG. 5. FIG. 5 is a schematic diagram illustrating that spectrum use information of secondary systems is modified according to second level interference ranges of the secondary systems according to an embodiment of the invention.

As illustrated in FIG. 5, a region 1 includes a primary system 1, a secondary system C and a secondary system D, a region 2 includes a primary system 1 and a secondary system B, and a region 3 includes a primary system 3 and a secondary system A. In a spectrum use limited reference zone 1 illustrated by the solid ellipse in the region 1, local interference of the secondary system C and the secondary system D in the region 1 to the primary system 1 in the region 1 may produce aggregated interference to the primary system 1 in the region 1 together with foreign interference of the secondary system A in the region 3 to the primary system 1 in the region 1. Moreover in a spectrum use limited reference zone 2 illustrated by the dotted ellipse in the region 2, local interference of the secondary system B in the region 2 to the primary system 2 in the region 2 may produce aggregated interference to the primary system 2 in the region 2 together with foreign interference of the secondary system C and the secondary system D in the region 1 to the primary system 2 in the region 2 as well as foreign interference of the secondary system A in the region 3 to the primary system 2 in the region 2.

According to an embodiment of the invention, the spectrum use information of the secondary systems in the first region is modified according to the operating condition information of the primary systems, in the one or more second regions, subjected to the aggregated interference of the secondary systems in the first region as well as interference condition information of the secondary systems which interfere with the primary systems, in the one or more second regions, subjected to the aggregated interference of the secondary systems in the first region, so that the secondary systems in the first region will not produce aggregated interference to the primary systems in the one or more second regions, where the primary systems, in the one or more second regions, subjected to the aggregated interference of the secondary systems in the first region, are determined according to the service range information of the primary systems in the one or more second regions as well as second level interference range information of the secondary systems in the first region, which is determined based on the spectrum use information of the secondary systems in the first region.

After the first region obtains the frequency use information of the secondary systems in the first region modified according to the first level interference ranges of the secondary systems in the first region, the first region transmits the modified frequency use information of the secondary systems in the first region to the one or more second regions with their primary systems falling into the first level interference ranges of the secondary systems in the first region. The second regions determines second level interference ranges of the secondary systems in the first region according to the received modified frequency use information of the secondary systems in the first region. Moreover the second regions can alternatively determine second level interference ranges of the secondary systems in the first region according to the original frequency use information of the secondary systems in the first region. That is, the second regions can determine the second level interference ranges of the secondary systems in the first region directly instead of determining firstly the first level interference ranges and then the second level interference ranges of the secondary systems in the first region. A second level interference range of a secondary system in the first region is a range in which interference of the secondary system in the first region to a primary system in a second region, located outside of a circle with a center being the secondary system in the first region and a radius being a second level interference radius can be ignored. Thus interference of the secondary system in the first region to a primary system in a second region, falling into the second level interference range of the secondary system in the first region shall be taken into account. Thus only interference of a secondary system in the first region to a primary system in a second region is taken into account in the first level interference range of the secondary system in the first region, and aggregated interference of the secondary system in the first region, the other secondary systems in the first region and/or the secondary systems in the one or more second regions to a primary system in a second region is taken into account in the second level interference range of the secondary system in the first region. Thus for a corresponding secondary system in the first region, the second level interference range is larger than the first level interference range. A primary system in a second region, located outside of the first level interference range but in the second level interference range may be subjected to aggregated interference from a plurality of secondary systems although it can operate. Although interference from a secondary system is very low, the interference may render a primary system in a second region inoperative upon aggregation with interference signals of other secondary systems. The second level interference radius $r_2$ of the secondary system in the first region can be calculated in the formula of:

$$Pt_{ss}-PL(r_2)=RS \qquad (2)$$

Where $Pt_{ss}$ is transmission power of the secondary system in the first region in a frequency band. $PL(r_2)$ is path fading calculated according to the second level interference radius $r_2$ and a channel model. For details thereof, reference can be made to ECC REPORT 159, "TECHNICAL AND OPERATIONAL REQUIREMENTS FOR THE POSSIBLE OPERATION OF COGNITIVE RADIO SYSTEMS IN THE "WHITE SPACES" OF THE FREQUENCY BAND 470-790 MHz", cardiff, January 2011. RS is a threshold of interference receivable by a receiver of the primary system in the second region, and interference below this value can be ignored. For example, if signal energy of interference is below $Pr_{PS\_min}$–PR–20 dB, then the interference can be ignored. Those skilled in the art can appreciate that the foregoing method of calculating a second level interference radius of a secondary system in the first region is merely exemplary and a second level interference radius of a secondary system in the first region can alternatively be calculated in another appropriate method. According to this embodiment, since transmission power of the secondary system in the first region is lowered in the first level interference range of the secondary system in the first region, the second level interference range of the secondary system in the first region can be lowered to thereby avoid an access to excessive interfering secondary system in other regions. Of course, as described above, the second regions can determine the second level interference ranges of the secondary systems in the first region directly according to the original frequency use information of the secondary systems in the first region without firstly determining the first level interference ranges of the secondary systems in the first region. In this case, the directly determined second level interference ranges may be larger than the second level interference ranges determined after the first level interference ranges are determined.

After the second level interference ranges of the secondary systems in the first region are determined, the primary systems in the one or more second regions can be searched for a primary system falling into a second level interference range of a secondary system in the first region according to the determined second level interference ranges of the secondary systems in the first region and the service range information of the primary systems in the one or more second regions. If a primary system in a second region is found falling into a second level interference range of a secondary system in the first region, then the primary system in the second region can be judged as a primary system, in a second region, subjected to interference of the secondary system in the first region, and other corresponding secondary systems which interfere with the primary systems, in the one or more second regions, subjected to aggregated interference of the secondary systems in the first region can be searched for.

After the primary systems, in the one or more second regions, subjected to aggregated interference of the secondary systems in the first regions are judged, and the secondary systems which interfere with the primary systems, in the one or more second regions, subjected to aggregated interference of the secondary systems in the first region are found, the spectrum use information of the secondary systems in the first regions can be modified according to the operating condition information of the judged primary systems, in the one or more second regions, subjected to aggregated interference of the secondary systems in the first regions, and interference condition information of the secondary systems which interfere with the primary systems, in the one or more second regions, subjected to aggregated interference of the secondary systems in the first region, so that the secondary systems in the first regions will not interfere with the primary systems in the one or more second regions. For example, the operating condition information of the primary system in the second region and the interference condition information of the secondary systems can include at least one of frequency bands, bandwidths, transmission power, spectrum use time limits, etc.

For example, in the example illustrated in FIG. 5, after the region 1 transmits spectrum use information of the secondary system C in the region 1, modified according to a first level interference range to the region 2, the region 2 can determine a second level interference range of the secondary system C in the region 1 according to the modified spectrum use information of the secondary system C in the region 1. Moreover the region 2 can alternatively determine a second level interference range of the secondary system C in the region 1 directly according to the original spectrum use information of the secondary system C in the region 1 without firstly determining the first level interference range of the secondary system C in the region 1. The second level interference range of the secondary system C in the region 1 is a range in which interference of the secondary system C in the region 1 to the primary system 2 in the region 2, located in a circle with a center being the secondary system C in the region 1 and a radius being the second level interference radius $r_2$ can be ignored. For example, the second level interference radius $r_2$ of the secondary system C in the region 1 can be calculated in the method described in the formula (2) above. After the second level interference range of the secondary system C in the region 1 is determined, whether the primary system 2 in the region 2 falls into the second level interference range of the secondary system C in the region 1 can be judged according to the determined second level interference range of the secondary system C in the region 1, service range information of the primary system 2 in the region 2, etc. If the primary system 2 in the region 2 falls into the second level interference range of the secondary system C in the region 1, then the primary system 2 in the region 2 can be judged as being subjected to aggregated interference of the secondary system C in the region 1, and other corresponding secondary systems which interfere with the primary system 2 in the region 2 can be searched for, e.g., the secondary system D in the region 1, the secondary system B in the region 2, the secondary system A in the region 3, etc. After the primary system 2 in the region 2 is judged as being subjected to aggregated interference of the secondary system C in the region 1, the secondary system D in the region 1, the secondary system B in the region 2 and the secondary system A in the region 3, the spectrum use information of the secondary system C in the region 1 can be modified according to operating condition information of the primary system 2 in the region 2, and interference condition information of the secondary system D in the region 1, the secondary system B in the region 2 and the secondary system A in the region 3, so that the secondary system C in the region 1 will not produce aggregated interference with the primary system 2 in the region 2.

According to an embodiment of the invention, the interference condition information of the secondary systems which interfere with the primary systems, in the one or more second regions, subjected to the aggregated interference of the secondary systems in the first region, is obtained by inquiring about interference condition information, recorded in a registering unit in the second region, to which different positions within a service range of the primary system in the second region are subjected from secondary systems in the second region and from secondary systems in other regions.

The registering unit in the second region can record interference condition information to which different positions within the service range of the primary system in the second region are subjected from the secondary systems in the second region and from secondary systems in other regions. Prior to spectrum use by a newly emerging secondary system, it can be judged whether the newly emerging secondary system will interfere with the primary system in the second region, and if the newly emerging secondary system is judged as interfering with the primary system in the second region, then spectrum use information of the newly emerging secondary system can be registered into the registering unit. Moreover the contents of the registering unit can be updated periodically, or the contents of the registering unit can be updated when there is a change in spectrum use condition of a primary system or a secondary system. According to an embodiment of the invention, the interference condition information from the secondary systems in the second region includes interference amounts of the secondary systems in the second region to the primary system in the second region and/or spectrum use time of the secondary systems in the second region, and the interference condition information from the secondary systems in the other regions includes region identifiers of the other regions and secondary system identifiers of the secondary systems in the other regions.

As illustrated in FIG. 5, when the secondary system C in the first region (the region 1) may produce aggregated interference to the primary system 2 in the second region (the region 2) together with which secondary systems in which regions are taken into account, interference condition information, recorded in a registering unit in the second region (the region 2), to which different positions within a service range of the primary system in the second region (the region 2) are subjected from the secondary systems in the second region (the region 2) and from the secondary systems in the other regions can be inquired about. For example, in the example illustrated in FIG. 5, knowledge of aggregated interference of the secondary system B in the second region (the region 2) together with the secondary systems in the other regions (the secondary system D in the region 1 and the secondary system A in the region 3) as well as the secondary system C in the first region (the region 1) to the primary system 2 in the second region (the region 2) can be obtained by inquiring the registering unit in the second region (the region 2).

In the case of the example illustrated in FIG. 5, the registering unit can record the interference condition information of the respective secondary systems in the form of Table 1 below.

TABLE 1

Registration table of interfering secondary systems

| Edge position of service range of primary system | Signal strength of primary system | Interference strength in region | Interference time limit in region | Interference strength in region | Interference time limit in region | interfering secondary system in other region (region identifier, secondary system identifier and time limit) |
|---|---|---|---|---|---|---|
| Spectrum use limited zone 1 | 54 dBuV | −70 dBm | T1 | −60 dBm | T3 | (3, A, T2) |
| Spectrum use limited zone 2 | 54 dBuV | −71 dBm | T2 | −51 dBm | T4 | (3, A, T1) (1, C, T3) (1, D, T4) |

With an inquiry to Table 1 in the registering unit, the spectrum use limited zone 2 in the region 2 is found to be further subjected to interference of the secondary system A in the region 3 as identified by (3, A, T1), where 3 is the region identifier of the region 3, A is the secondary system identifier of the secondary system A in the region 3, and T1 is an interference valid time.

How the registering unit in the second region records interference condition information to which different positions within the service range of the primary system in the second region are subjected from the secondary systems in the second region and from secondary systems in other regions.

Figure 6:
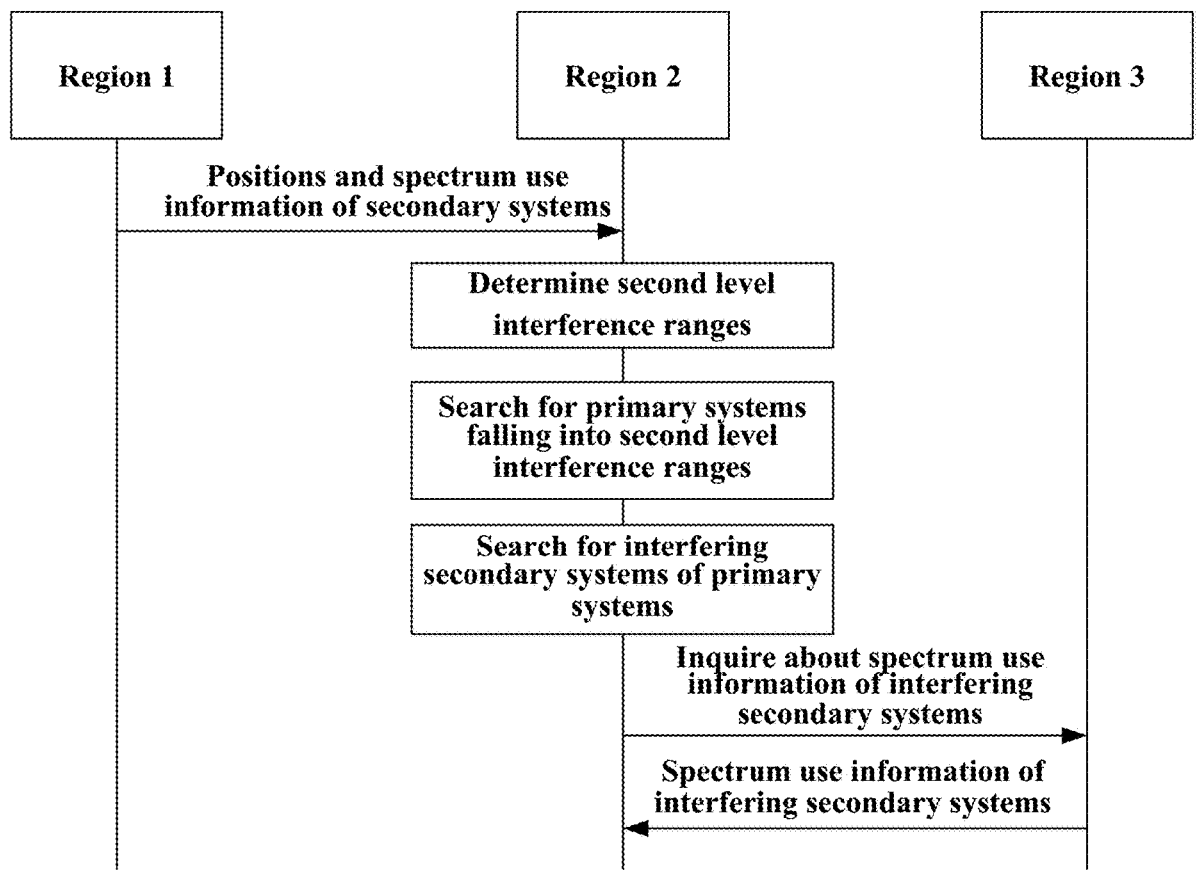
FIG. 6 is a schematic diagram illustrating that an interfering secondary system is searched for according to second level interference ranges of secondary systems according to an embodiment of the invention.

A process of searching for an interfering secondary system according to second level interference ranges of secondary systems according to an embodiment of the invention will be described below with reference to FIG. 6. FIG. 6 is a schematic diagram illustrating that an interfering secondary system is searched for according to second level interference ranges of secondary systems according to an embodiment of the invention.

As illustrated in FIG. 6, the region 1 transmits position information of the secondary system C in the region 1, and the spectrum use information of the secondary system C in the region 1, modified according to the first level interference range of the secondary system C in the region 1 to the region 2. The region 2 determines the second level interference range of the secondary system C in the region 1 according to the received modified spectrum use information of the secondary system C in the region 1. Then the region 2 searches for a primary system in a second region, falling in the second level interference range of the secondary system C in the region 1 according to the determined second level interference range of the secondary system C in the region 1, the service range information of the primary system 2 in the region 2, etc., and then searches for secondary systems which interfere with the primary system in the second region, falling in the second level interference range by inquiring registration Table 1 of interfering secondary systems stored in the registering unit. For example, in the example illustrated in FIG. 5, the primary system 2 in the region 2 falls into the second level interference range of the secondary system C in the region 1, and with an inquiry to registration Table 1 of interfering secondary systems above, secondary systems which interfere with the primary system 2 in the region 2 are found including the secondary system A in the region 3, the secondary system D in the region 1 and the secondary system B in the region 2. After the secondary systems which interfere with the primary system in the second region, falling in the second level interference range are found, the regions where the secondary systems are located can be inquired about the spectrum use information of the secondary systems. For example, in the example illustrated in FIG. 5, after the secondary system A in the region 3 is founded to interfere with the primary system 2 in the region 2, the region 2 can inquire the region 3 where the secondary system A is located about spectrum use information of the secondary system A. and the region 3 can transmit the spectrum use information of the secondary system A in the region 3 to the region 2.

Figure 7:
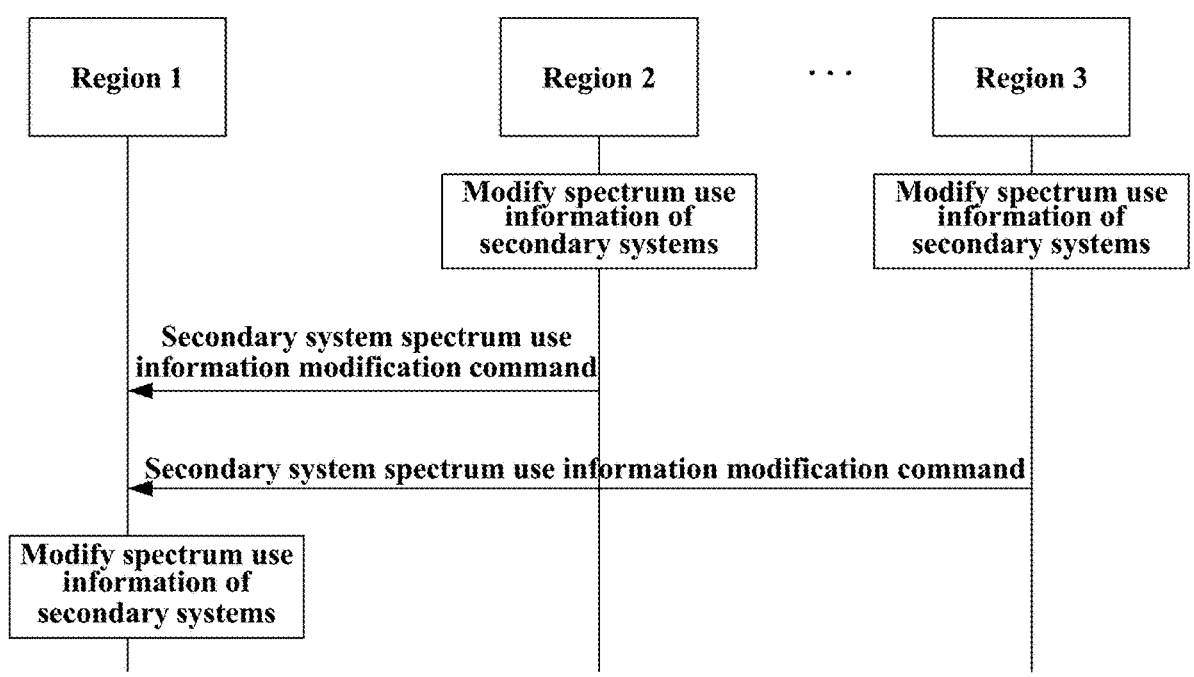
FIG. 7 is a schematic diagram illustrating an implementation in which spectrum use information of secondary systems is modified according to second level interference ranges of the secondary systems according to an embodiment of the invention.

An implementation in which spectrum use information of secondary systems is modified according to second level interference ranges of the secondary systems according to an embodiment of the invention will be described below with reference to FIG. 7. FIG. 7 is a schematic diagram illustrating an implementation in which spectrum use information of secondary systems is modified according to second level interference ranges of the secondary systems according to an embodiment of the invention.

As illustrated in FIG. 7, the respective second regions (the region 2, . . . , the region n can modify the spectrum use information of the secondary systems in the first region (the region 1) respectively according to the operating condition information of the primary systems in the corresponding second regions, located in the second level interference ranges, and the interference condition information of the other secondary system which interfere with the primary systems in the corresponding second regions, located in the second level interference ranges, and transmit the modified spectrum use information of the secondary systems respectively to the first region in a secondary system spectrum use information modification command. The first region modifies synthetically the spectrum use information of the secondary systems in the first region upon reception of the modified spectrum use information of the secondary systems transmitted from the respective second regions, so that the secondary systems in the first region will not interfere with the primary systems in the respective second regions.

Figure 8:
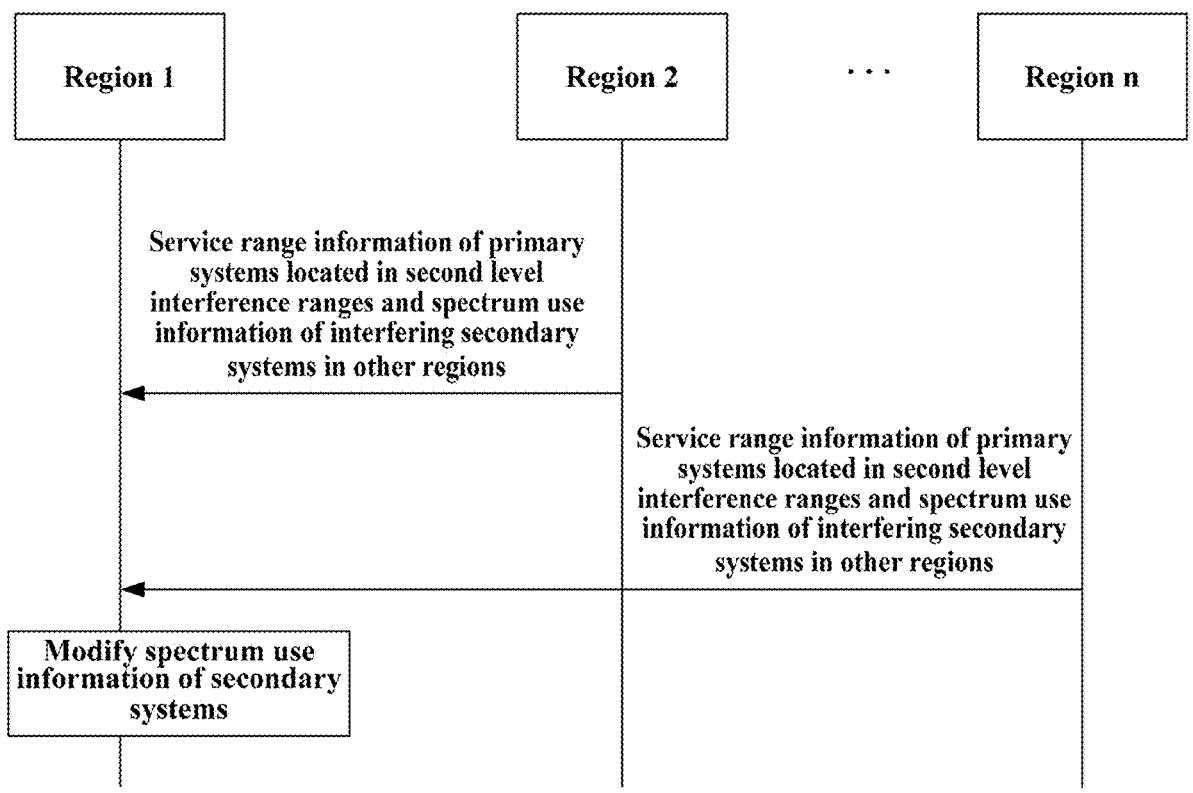
FIG. 8 is a schematic diagram illustrating another implementation in which spectrum use information of secondary systems is modified according to second level interference ranges of the secondary systems according to an embodiment of the invention.

Another implementation in which spectrum use information of secondary systems is modified according to second level interference ranges of the secondary systems according to an embodiment of the invention will be described below with reference to FIG. 8. FIG. 8 is a schematic diagram illustrating another implementation in which spectrum use information of secondary systems is modified according to second level interference ranges of the secondary systems according to an embodiment of the invention.

As illustrated in FIG. 8, the first region (the region 1) transmits the position information, the spectrum use information, etc., of the secondary systems in the first region to the one or more second regions. The respective second regions (the region 2, . . . , the region n) can transmit the service range information of the primary systems in the respective second regions, falling into the second level interference ranges of the secondary systems in the first region, and the interference condition information of the secondary system in the other regions, which interfere with the primary systems in the respective second regions, located in the second level interference ranges respectively to the first region (the region 1). The first region modifies synthetically the spectrum use information of the secondary systems in the first region upon reception of the service range information of the primary systems in the respective second regions, falling into the second level interference ranges of the secondary systems in the first region, and the interference condition information of the secondary system in the other regions, which interfere with the primary systems in the respective second regions, located in the second level interference ranges, transmitted from the respective second regions, so that the secondary systems in the first region will not produce aggregated interference to the primary systems in the respective second regions.

Figure 9:
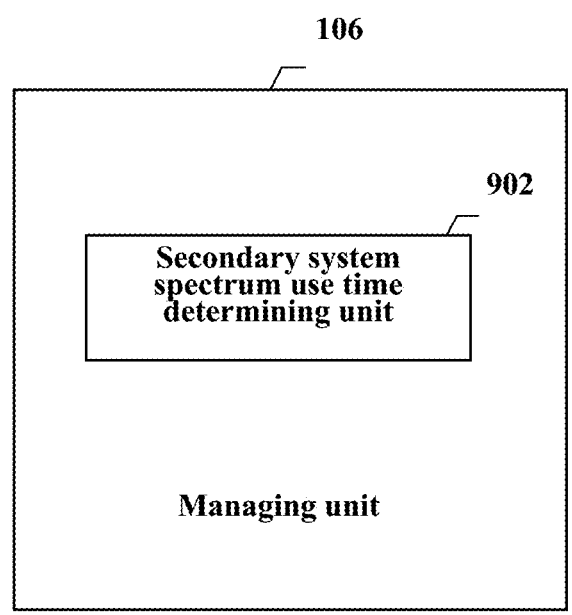
FIG. 9 is a block diagram illustrating a configuration of a managing unit illustrated in FIG. 1.

A configuration of the managing unit illustrated in FIG. 1 will be described below with reference to FIG. 9. FIG. 9 is a block diagram illustrating a configuration of the managing unit illustrated in FIG. 1.

According to an embodiment of the invention, the managing unit 106 further includes: a secondary system spectrum use time determining unit 902 for determining spectrum use valid time of the secondary systems in the first region according to a spectrum use time limit of the primary system in the first region and spectrum use time limits of the primary systems, in the one or more second regions, subjected to interference of the secondary systems in the first region.

Particularly spectrum use information of a secondary system can be modified by checking spectrum use conditions of existing primary systems and secondary systems over some duration. This duration can be determined according to a desired spectrum use duration provided by the secondary system. The duration can be determined with reference to a spectrum available time limit if no desired spectrum use duration is provided by the secondary system. The spectrum available time limit refers to a period of time over which availability of a spectrum can be determined according to predictable operating conditions of the primary systems and the secondary systems and beyond which the available spectrum becomes invalid and instead an available spectrum needs to be recalculated. If the desired spectrum use time provided by the secondary system is far below the spectrum available time limit, then the spectrum use time can be modified at lowered complexity.

According to an embodiment of the invention, the receiving unit 104 is further adapted to receive, from the secondary systems in the first region, secondary system spectrum use durations estimated by the secondary systems in the first region; and the secondary system spectrum use time determining unit is further adapted to modify the spectrum use time of the secondary systems in the first region according to the spectrum use valid time and the secondary system spectrum use durations.

If there is a change in spectrum use conditions of the existing primary systems and secondary systems over the duration, then the spectrum use information of the secondary system can be modified in the following three approaches.

In a first approach, the spectrum use information of the secondary system is modified according to conditions prior to a first change in spectrum use of the existing primary systems and secondary systems, and then the spectrum use time limit of the secondary system is updated to the period for the first change in spectrum use of the existing primary systems and/or secondary systems.

In a second approach, the modified spectrum use information of the secondary system is determined according to the spectrum use change conditions of the existing primary systems and secondary systems over the duration, and the period of time for the change is marked.

In a third approach, the spectrum use information of the secondary system is modified over the duration, and a spectrum use pattern is determined, so that spectrum use of the secondary system will not interfere with spectrum use of the primary systems and the secondary systems with different changes over the period of time.

According to an embodiment of the invention, the secondary system spectrum use durations are estimated according to the spectrum use information of the secondary systems in the first region and application types of the secondary systems in the first region.

Figure 10:
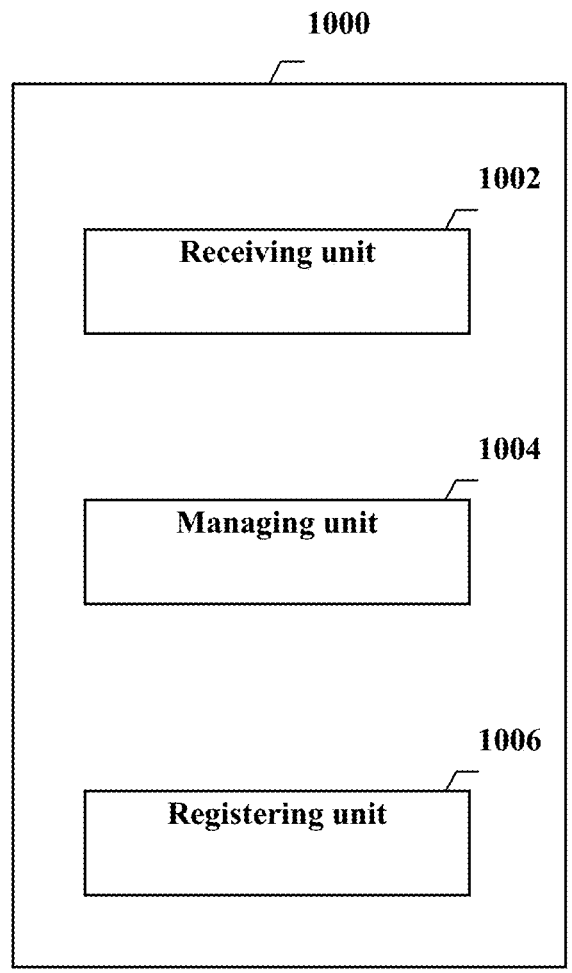
FIG. 10 is a block diagram illustrating a configuration of an apparatus in a wireless communication system according to another embodiment of the invention.

A configuration of an apparatus in a wireless communication system according to another embodiment of the invention will be described below with reference to FIG. 10. FIG. 10 is a block diagram illustrating a configuration of an apparatus in a wireless communication system according to another embodiment of the invention.

As illustrated in FIG. 10, the apparatus 1000 in a wireless communication includes a receiving unit 1002, a managing unit 1004 and a registering unit 1006, where the receiving unit 1002 and the managing unit 1004 are configured the same with the receiving unit 102 and the managing unit 104 in the apparatus 100 illustrated in FIG. 1 respectively, so a detailed description thereof will be omitted here. The registering unit 1006 in the apparatus 1000 will be described below in details.

As illustrated in FIG. 10, the registering unit 1006 in the apparatus 1000 in a wireless communication system can record interference condition information to which different positions within a service range of the primary system in the first region are subjected from the secondary systems in the first region and from secondary systems in other regions.

According to an embodiment of the invention, the interference condition information from the secondary systems in the first region includes interference amounts of the secondary systems in the first region to the primary system in the first region and/or spectrum use valid time of the secondary systems in the first region, and the interference condition information from the secondary systems in the other regions includes region identifiers of the other regions and secondary system identifiers of the secondary systems in the other regions.

Figure 11:
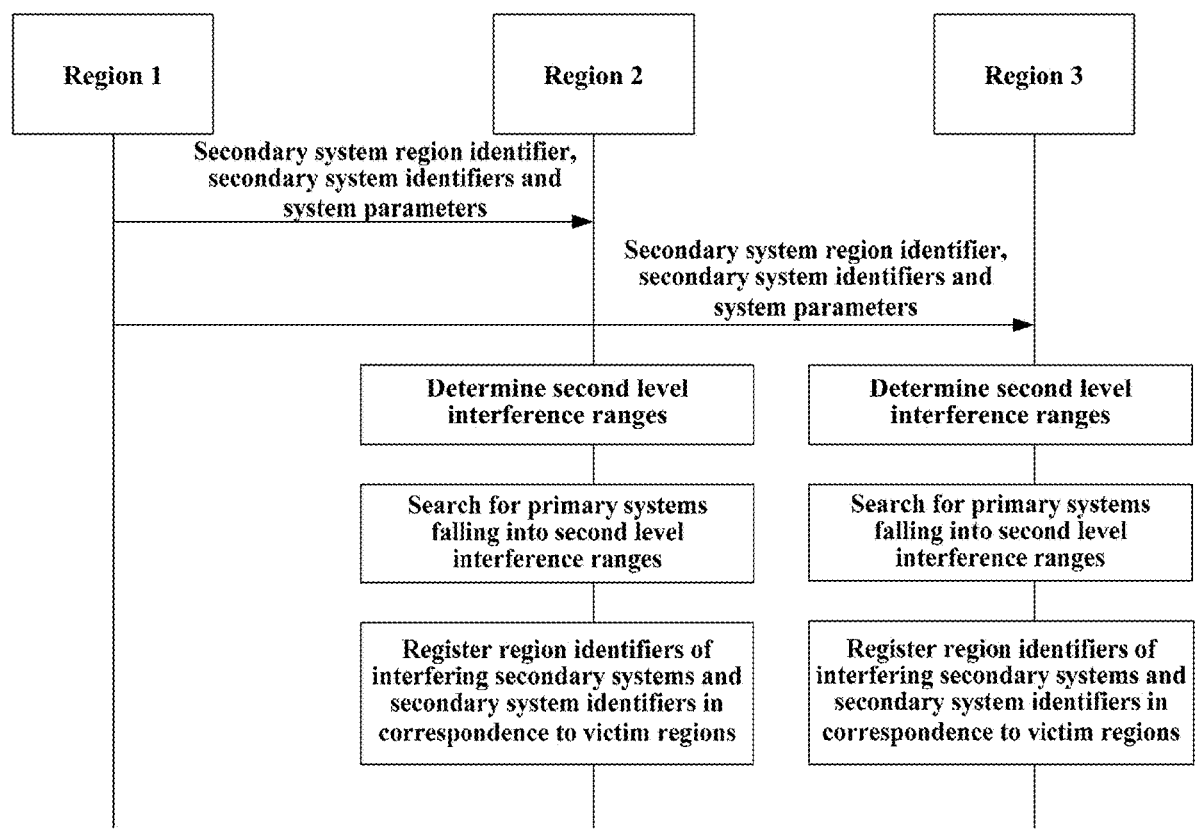
FIG. 11 is a schematic diagram illustrating that interference information of secondary systems is recorded according to an embodiment of the invention.

A process of recording interference information of secondary systems according to an embodiment of the invention will be described below with reference to FIG. 11. FIG. 11 is a schematic diagram illustrating that interference information of secondary systems is recorded according to an embodiment of the invention.

As illustrated in FIG. 11, after the spectrum use information of the secondary systems in the first region (the region 1) is modified, interference of the secondary systems in the first region to the primary system in the first region is calculated. Even if the secondary systems in the first region will not interfere with the primary system in the first region, a tolerated interference range of the primary system in the first region may be lowered at the edge of the service area of the primary system due to an influence of the secondary systems in the first region. Then the first region transmits the region identifier of the region where the secondary systems are located, the secondary system identifiers, system parameters e.g., antenna heights and antenna types, categories of transmission masks, transmission power, types of secondary system, air interface information, etc., of the secondary systems) to the one or more second regions (the region 2 and the region 3). The respective second regions determine the second level interference ranges of the secondary systems in the first region respectively upon reception of the above information. Then the respective second regions search for primary systems falling into the second level interference ranges respectively according to the determined second level interference ranges of the secondary systems in the first region, the service range information of the primary systems in the corresponding second regions, etc. Then the region identifiers of the regions where the interfering secondary systems are located, the secondary system identifiers and the interference periods of time are recorded into registration Table 1 of interfering secondary systems in correspondence to the victim regions.

According to an embodiment of the invention, the first region can further transmit a region identifier of the first region and secondary system identifiers of the secondary systems in the first region to the one or more second regions.

Figure 12:
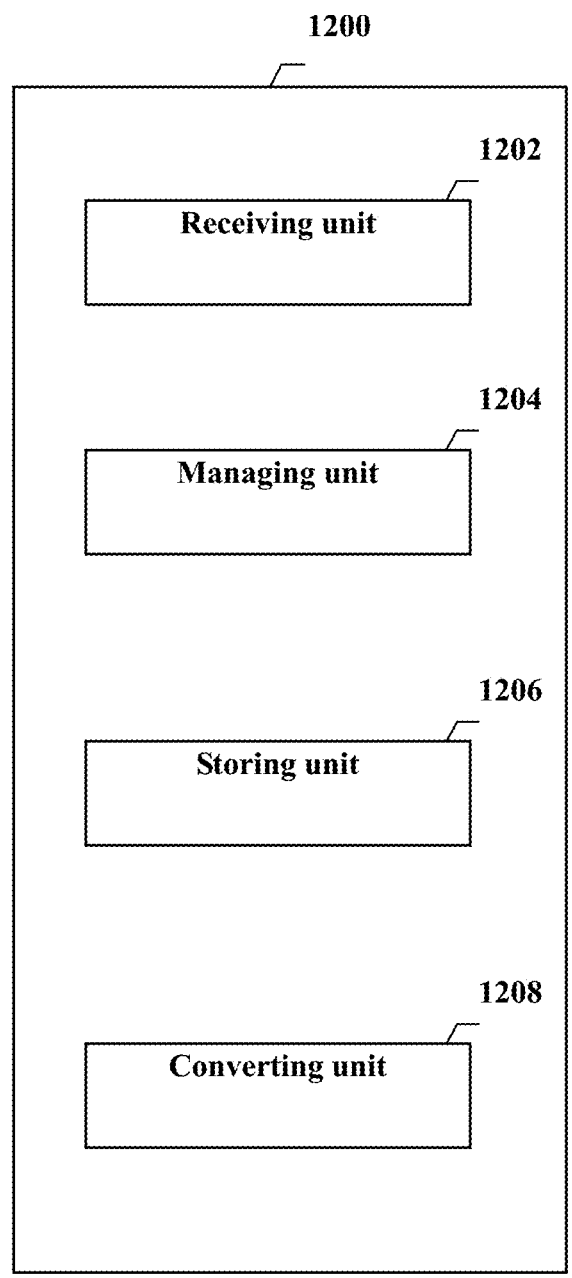
FIG. 12 is a block diagram illustrating a configuration of an apparatus in a wireless communication system according to still another embodiment of the invention.

A configuration of an apparatus in a wireless communication system according to still another embodiment of the invention will be described below with reference to FIG. 12. FIG. 12 is a block diagram illustrating a configuration of an apparatus in a wireless communication system according to still another embodiment of the invention.

As illustrated in FIG. 12, the apparatus 1200 in a wireless communication includes a receiving unit 1202, a managing unit 1204, a storing unit 1206 and a converting unit 1208, where the receiving unit 1202 and the managing unit 1204 are configured the same with the receiving unit 102 and the managing unit 104 in the apparatus 100 illustrated in FIG. 1 respectively, so a detailed description thereof will be omitted here. The storing unit 1206 and the converting unit 1208 in the apparatus 1200 will be described below in details.

As illustrated in FIG. 12, the storing unit 1206 in the apparatus 1200 in a wireless communication system can store descriptions of transmission masks of secondary systems in the first region and the one or more second regions and corresponding identifiers thereof.

As illustrated in FIG. 12, the converting unit 1208 in the apparatus 1200 in a wireless communication system can convert the identifiers of the transmission masks of secondary system from the one or more second regions into descriptions of corresponding transmission masks of secondary systems according to the descriptions of the transmission masks or frequency bands of secondary systems in the one or more second regions and the corresponding identifiers thereof, which are stored in the storing unit.

Figure 13:
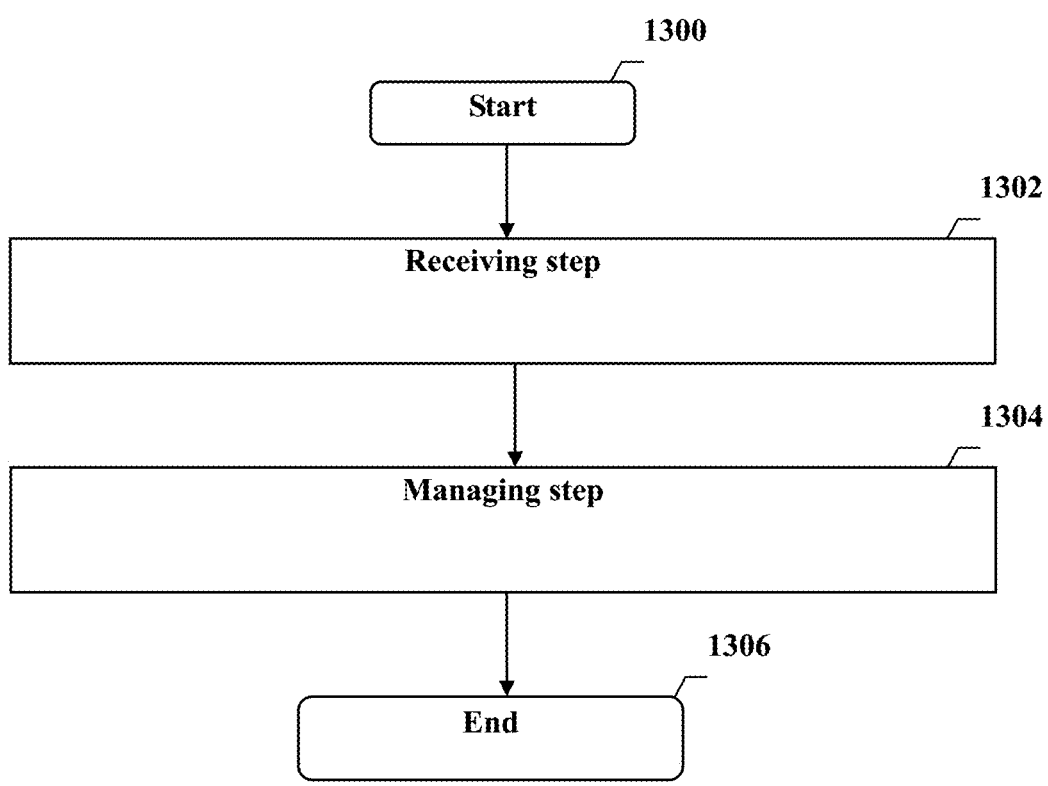
FIG. 13 is a flow chart illustrating a method for use in a wireless communication system according to an embodiment of the invention.

A method for use in a wireless communication system according to an embodiment of the invention will be described below with reference to FIG. 13. FIG. 13 is a flow chart illustrating a method for use in a wireless communication system according to an embodiment of the invention.

As illustrated in FIG. 13, the method starts with the step 1300. After the step 1300, the method proceeds to the step 1302.

The step 1302 is a receiving step. In the step 1302, reference information for modifying spectrum use information of secondary systems in a first region is received from at least some of one or more second regions, where the at least some of the one or more second regions are regions in which primary systems are judged, according to the spectrum use information of the secondary systems in the first region, as being subjected to interference of the secondary systems in the first region.

After the step 1302, the method proceeds to the step 1304.

The step 1304 is a managing step. In the step 1304, the spectrum use information of the secondary systems in the first region is modified according to the received reference information.

The method illustrated in FIG. 13 is a method corresponding to the apparatus illustrated in FIG.1, and a detailed description thereof will be omitted here.

Figure 14:
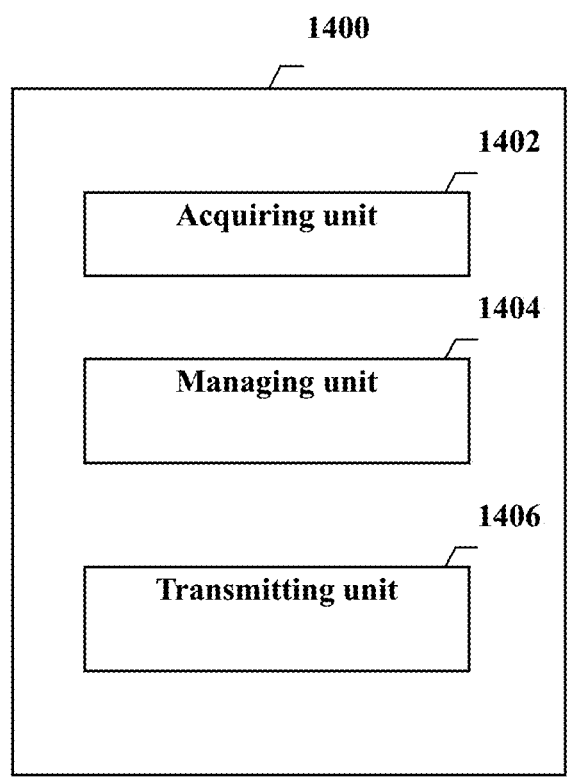
FIG. 14 is a block diagram illustrating a configuration of an apparatus in a wireless communication system according to still embodiment of the invention.

A configuration of an apparatus in a wireless communication system according to still another embodiment of the invention will be described below with reference to FIG. 14. FIG. 14 is a block diagram illustrating a configuration of an apparatus in a wireless communication system according to still another embodiment of the invention.

As illustrated in FIG. 14, the apparatus 1400 in a wireless communication system includes an acquiring unit 1402, a managing unit 1404 and a transmitting unit 1406.

The acquiring unit 1402 can acquire spectrum use information of secondary systems in a first region. As described above, a second region can receive the spectrum use information of the secondary systems in the first region from the first region; or the second region can detect the spectrum use information of the secondary systems in the first region.

The managing unit 1404 in the apparatus 1400 in a wireless communication system can judge, according to the spectrum use information of the secondary systems in the first region, whether the secondary systems in the first region interfere with a primary system in a second region.

The transmitting unit 1406 in the apparatus 1400 in a wireless communication system can transmit reference information for modifying the spectrum use information of the secondary systems in the first region to the first region in the case that the secondary systems in the first region interfere with the primary system in the second region.

According to an embodiment of the invention, the reference information includes at least one of: service range information of the primary system, in the second region, subjected to interference of the secondary systems in the first region, and secondary-system-related information of the secondary systems which interfere with the primary system in the second region.

According to an embodiment of the invention, the primary system, in the second region, subjected to the interference of the secondary systems in the first region is searched for according to the service range information of the primary system in the second region as well as first level interference range information of the secondary systems in the first region, which is determined based on the spectrum use information of the secondary systems in the first region, where the spectrum use information of the secondary systems in the first region is modified according to operating condition information of the primary system, in the second region, subjected to interference of the secondary systems in the first region, so that the secondary systems in the first region will not interfere with the primary system in the second region.

According to an embodiment of the invention, it is judged, according to the spectrum use information of the secondary systems in the first region as well as spectrum use information of other secondary systems in the first region and/or the secondary systems in the one or more second regions, whether the secondary systems in the first region produce aggregated interference to the primary system in the second region.

According to an embodiment of the invention, the primary system, in the second region, subjected to aggregated interference of the secondary systems in the first region is searched for according to the service range information of the primary system in the second region as well as second level interference range information of the secondary systems in the first region, which is determined based on the spectrum use information of the secondary systems in the first region, where the spectrum use information of the secondary systems in the first region is modified according to operating condition information of the primary system, in the second region, subjected to aggregated interference of the secondary systems in the first region as well as interference condition information of secondary systems which interfere with the primary system, in the second region, subjected to aggregated interference of the secondary systems in the first region, so that the secondary systems in the first region do not produce aggregated interference to the primary system in the second region.

According to an embodiment of the invention, the interference condition information of the secondary systems which interfere with the primary system, in the second region, subjected to aggregated interference of the secondary systems in the first region, is obtained by inquiring about interference condition information, recorded in a registering unit in the second region, to which different positions within a service range of the primary system in the second region are subjected from secondary systems in the second region and from secondary systems in other regions.

According to an embodiment of the invention, the interference condition information from the secondary systems in the second region includes interference amounts of the secondary systems in the second region to the primary system in the second region and/or spectrum use valid time of the secondary systems in the second region, and the interference condition information from the secondary systems in the other regions includes region identifiers of the other regions and secondary system identifiers of the secondary systems in the other regions.

According to an embodiment of the invention, the acquiring unit further acquires a region identifier of the first region and secondary system identifiers of the secondary systems in the first region.

Figure 15:
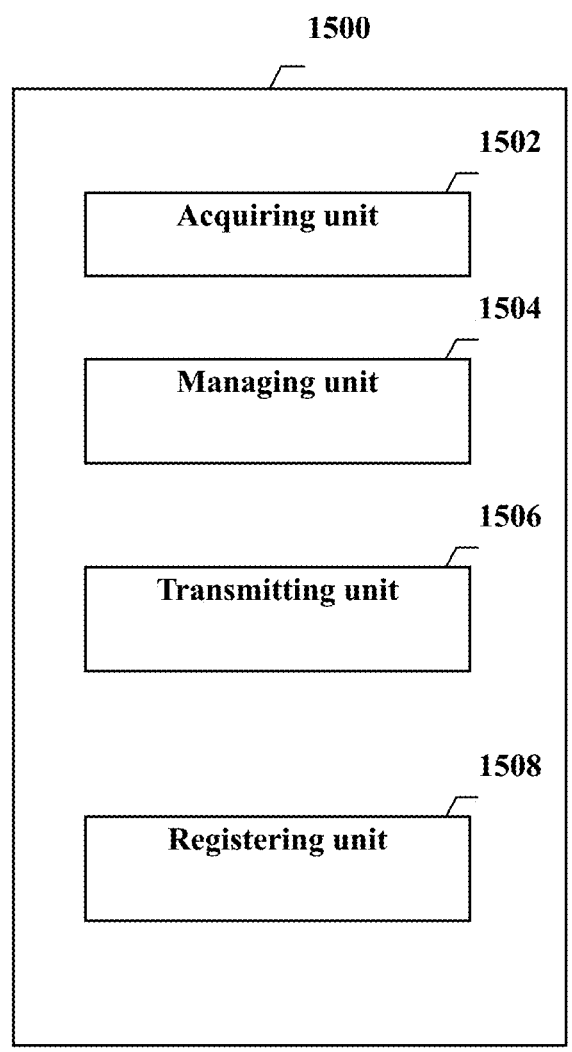
FIG. 15 is a block diagram illustrating a configuration of an apparatus in a wireless communication system according to still another embodiment of the invention.

A configuration of an apparatus in a wireless communication system according to still another embodiment of the invention will be described below with reference to FIG. 15. FIG. 15 is a block diagram illustrating a configuration of an apparatus in a wireless communication system according to still another embodiment of the invention.

As illustrated in FIG. 15, the apparatus 1500 in a wireless communication system includes an acquiring unit 1502, a managing unit 1504, a transmitting unit 1506 and a registering unit 1508, where the acquiring unit 1502, the managing unit 1504 and the transmitting unit 1506 are configured the same with the acquiring unit 1402, the managing unit 1404 and the transmitting unit 1406 in the apparatus 1400 illustrated in FIG. 14 respectively, so a detailed description thereof will be omitted here. The registering unit 1508 in the apparatus 1500 will be described below in details.

As illustrated in FIG. 15, the registering unit 1508 can record interference condition information to which different positions within a service range of the primary system in the second region are subjected from the secondary systems in the second region and from secondary systems in other regions.

According to an embodiment of the invention, the interference condition information from the secondary systems in the second region includes interference amounts of the secondary systems in the second region to the primary system in the second region and/or spectrum use valid time of the secondary systems in the second region, and the interference condition information from the secondary systems in the other regions includes region identifiers of the other regions and secondary system identifiers of the secondary systems in the other regions.

Figure 16:
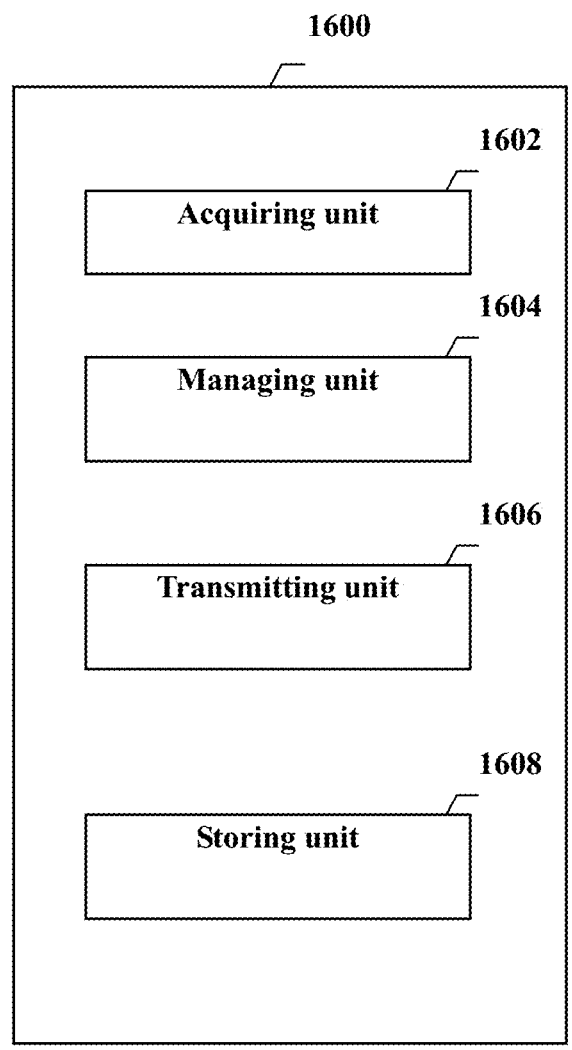
FIG. 16 is a block diagram illustrating a configuration of an apparatus in a wireless communication system according to still another embodiment of the invention.

A configuration of an apparatus in a wireless communication system according to still another embodiment of the invention will be described below with reference to FIG. 16. FIG. 16 is a block diagram illustrating a configuration of an apparatus in a wireless communication system according to still another embodiment of the invention.

As illustrated in FIG. 16, the apparatus 1600 in a wireless communication system includes an acquiring unit 1602, a managing unit 1604, a transmitting unit 1606 and a storing unit 1608, where the acquiring unit 1602, the managing unit 1604 and the transmitting unit 1606 are configured the same with the acquiring unit 1402, the managing unit 1404 and the transmitting unit 1406 in the apparatus 1400 illustrated in FIG. 14 respectively, so a detailed description thereof will be omitted here. The storing unit 1608 in the apparatus 1600 will be described below in details.

As illustrated in FIG. 16, the storing unit 1608 can store descriptions of transmission masks of secondary system in the first region and the second region and corresponding identifiers thereof.

Figure 17:
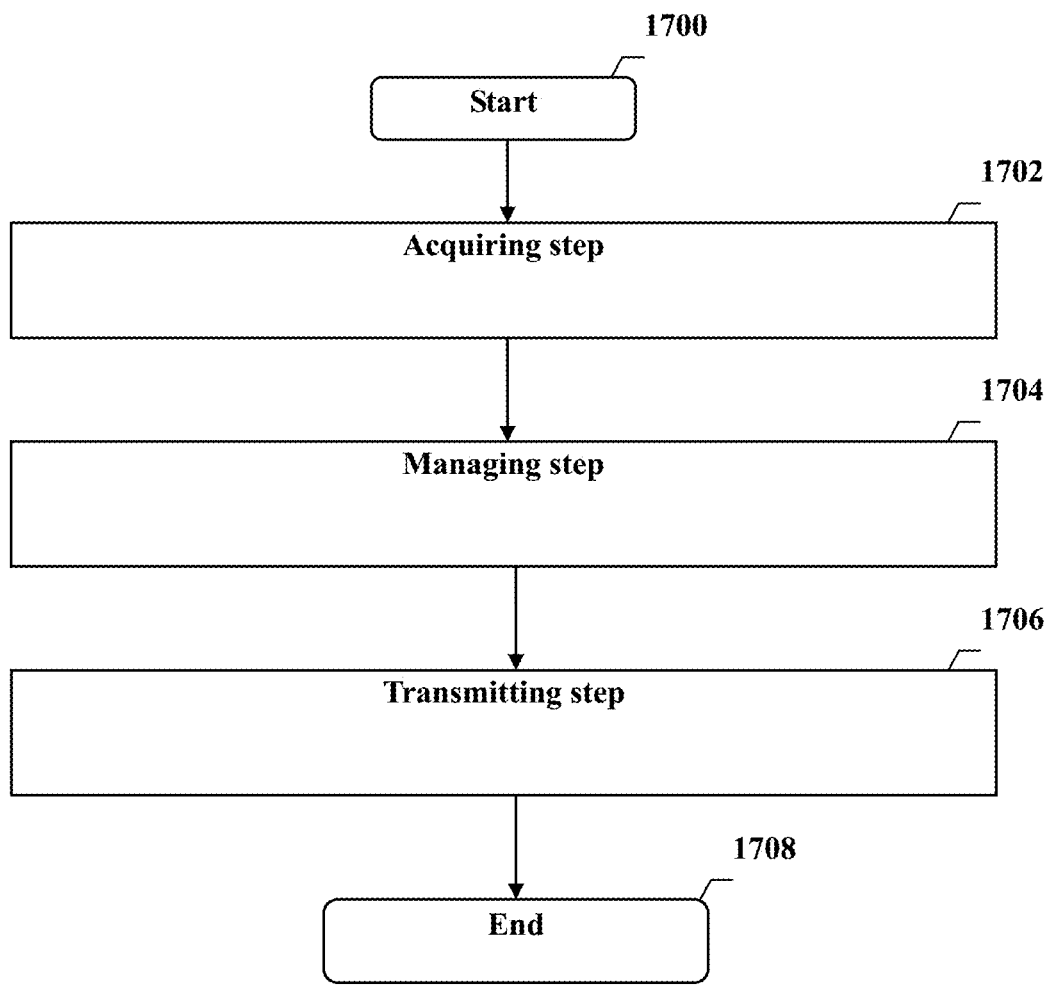
FIG. 17 is a flow chart illustrating a method for use in a wireless communication system according to another embodiment of the invention.

A method for use in a wireless communication system according to another embodiment of the invention will be described below with reference to FIG. 17. FIG. 17 is a flow chart illustrating a method for use in a wireless communication system according to another embodiment of the invention.

As illustrated in FIG. 17, the method starts with the step 1700. After the step 1700, the method proceeds to the step 1702.

The step 1702 is an acquiring step. In the step 1702, spectrum use information of secondary systems in a first region is acquired.

After the step 1702, the method proceeds to the step 1704.

The step 1704 is a managing step. In the step 1704, it is judged, according to the spectrum use information of the secondary systems in the first region, whether the secondary systems in the first region interfere with a primary system in a second region.

After the step 1704, the method proceeds to the step 1706. The step 1706 is a transmitting step. In the step 1706, reference information for modifying the spectrum use information of the secondary systems in the first region is transmitted to the first region in the case that the secondary systems in the first region interfere with the primary system in the second region.

The method illustrated in FIG. 17 is a method corresponding to the apparatus illustrated in FIG. 14, and a detailed description thereof will be omitted here.

Figure 18:
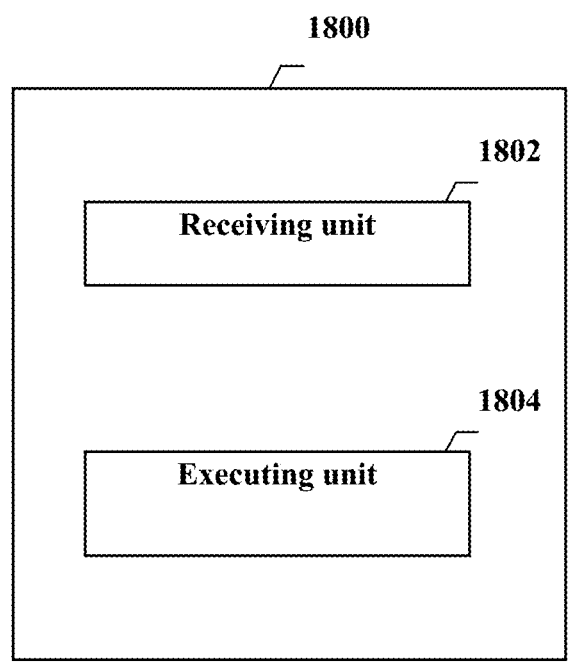
FIG. 18 is a block diagram illustrating a configuration of an apparatus in a wireless communication system according to still another embodiment of the invention.

A configuration of an apparatus in a wireless communication system according to still another embodiment of the invention will be described below with reference to FIG. 18. FIG. 18 is a block diagram illustrating a configuration of an apparatus in a wireless communication system according to still another embodiment of the invention.

As illustrated in FIG. 18, the apparatus 1800 in a wireless communication system can include a receiving unit 1802 and an executing unit 1804.

As illustrated in FIG. 18, the receiving unit 1802 in the apparatus 1800 can receive, from a first region, spectrum use information of secondary systems in the first region, which is modified according to reference information, where the reference information is received by the first region from at least some of one or more second regions, and the at least some of the one or more second regions are regions in which primary systems are judged, according to the spectrum use information of the secondary systems in the first region, as being subjected to interference of the secondary systems in the first region.

Referring back to FIG. 18, the executing unit 1804 in the apparatus 1800 can communicate with user equipments of the secondary systems in the first region according to the modified spectrum use information of secondary systems in the first region.

Figure 19:
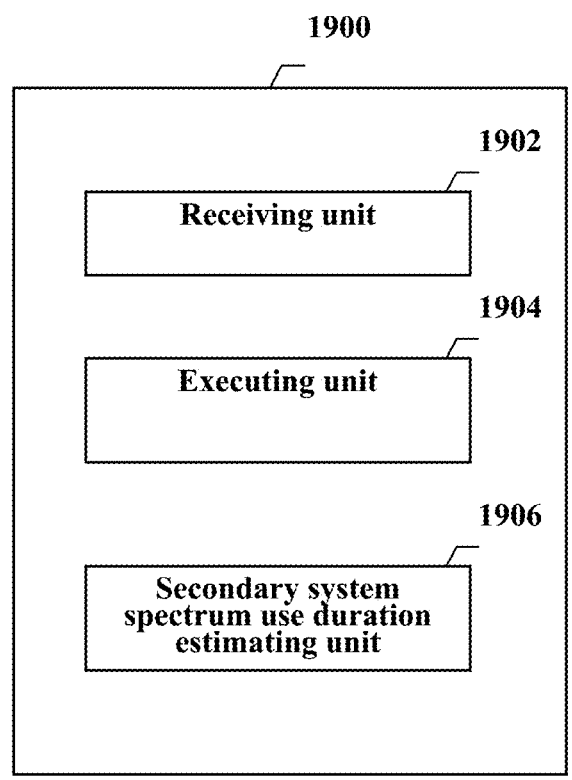
FIG. 19 is a block diagram illustrating a configuration of an apparatus in a wireless communication system according to still another embodiment of the invention.

A configuration of an apparatus in a wireless communication system according to still another embodiment of the invention will be described below with reference to FIG. 19. FIG. 19 is a block diagram illustrating a configuration of an apparatus in a wireless communication system according to still another embodiment of the invention.

As illustrated in FIG. 19, the apparatus 1900 in a wireless communication system can include a receiving unit 1902, an executing unit 1904 and a secondary system spectrum use duration estimating unit 1906, where the receiving unit 1902 and the executing unit 1904 are configured the same as the receiving unit 1802 and the executing unit 1804 in the apparatus 1800 illustrated in FIG. 18 respectively, so a detailed description thereof will be omitted here. The secondary system spectrum use duration estimating unit 1906 in the apparatus 1900 will be described below in details.

As illustrated in FIG. 19, the secondary system spectrum use duration estimating unit 1906 can estimate secondary system spectrum use durations according to the spectrum use information of the secondary systems in the first region and application types of the secondary systems in the first region.

Figure 20:
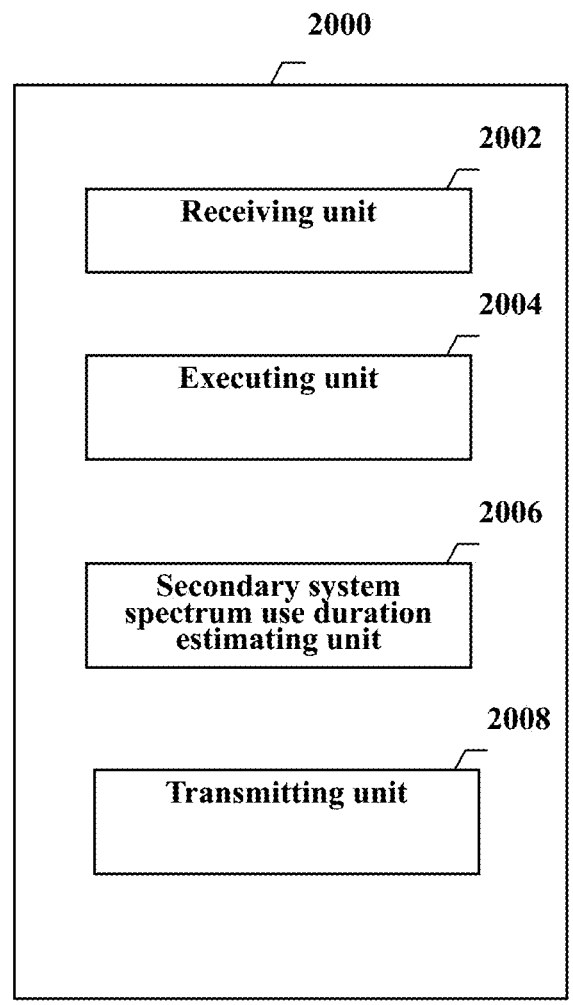
FIG. 20 is a block diagram illustrating a configuration of an apparatus in a wireless communication system according to still another embodiment of the invention.

A configuration of an apparatus in a wireless communication system according to still another embodiment of the invention will be described below with reference to FIG. 20. FIG. 20 is a block diagram illustrating a configuration of an apparatus in a wireless communication system according to still another embodiment of the invention.

As illustrated in FIG. 20, the apparatus 2000 in a wireless communication system can include a receiving unit 2002, an executing unit 2004, a secondary system spectrum use duration estimating unit 2006 and a transmitting unit 2008, where the receiving unit 2002, the executing unit 2004 and the secondary system spectrum use duration estimating unit 2006 are configured the same as the receiving unit 1902, the executing unit 1904 and the secondary system spectrum use duration estimating unit 1906 in the apparatus 1900 illustrated in FIG. 19 respectively, so a detailed description thereof will be omitted here. The transmitting unit 2008 in the apparatus 2000 will be described below in details.

As illustrated in FIG. 20, the transmitting unit 2008 in the apparatus 2000 can transmit the estimated secondary system spectrum use durations to the primary system of the first region.

Figure 21:
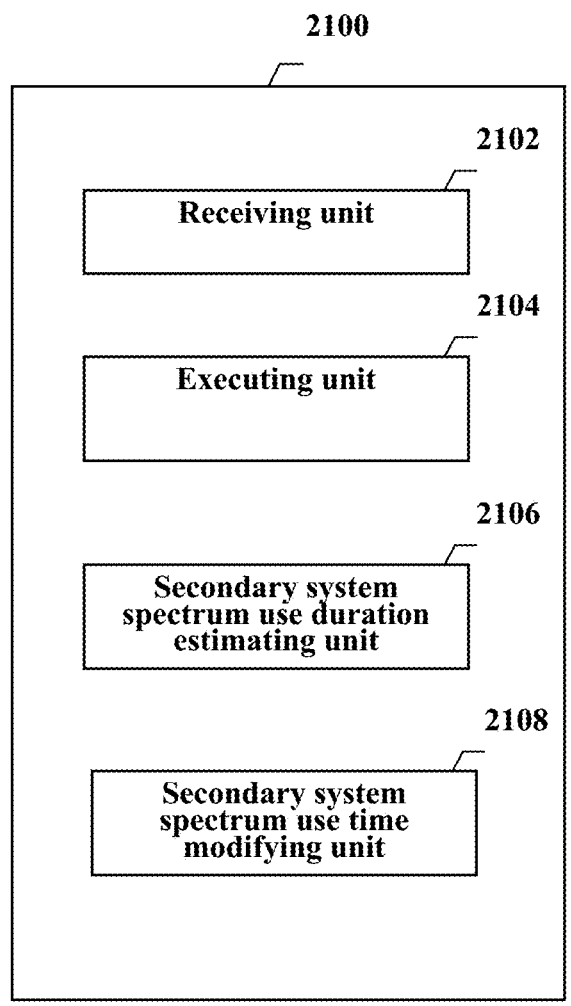
FIG. 21 is a block diagram illustrating a configuration of an apparatus in a wireless communication system according to still another embodiment of the invention.

A configuration of an apparatus in a wireless communication system according to still another embodiment of the invention will be described below with reference to FIG. 21. FIG. 21 is a block diagram illustrating a configuration of an apparatus in a wireless communication system according to still another embodiment of the invention.

As illustrated in FIG. 21, the apparatus 2100 in a wireless communication system can include a receiving unit 2102, an executing unit 2104, a secondary system spectrum use duration estimating unit 2106 and a secondary system spectrum use time modifying unit 2108, where the receiving unit 2102, the executing unit 2104 and the secondary system spectrum use duration estimating unit 2106 are configured the same as the receiving unit 1902, the executing unit 1904 and the secondary system spectrum use duration estimating unit 1906 in the apparatus 1900 illustrated in FIG. 19 respectively, so a detailed description thereof will be omitted here. The secondary system spectrum use time modifying unit 2108 in the apparatus 2100 will be described below in details.

As illustrated in FIG. 21, the secondary system spectrum use time modifying unit 2108 in the apparatus 2100 can modify spectrum use of the secondary systems in the first region according to changes in spectrum use conditions of the primary system and the secondary systems in the first region within the secondary system spectrum use durations or spectrum available time limits.

Figure 22:
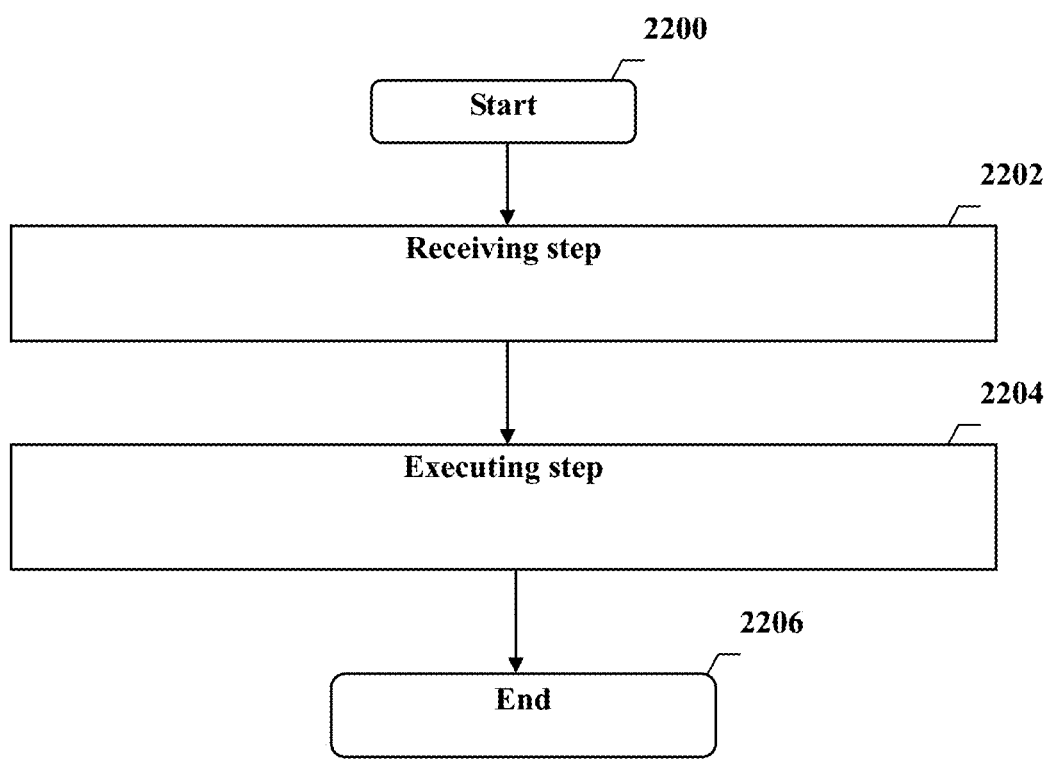
FIG. 22 is a flow chart illustrating a method for use in a wireless communication system according to an embodiment of the invention.

A method for use in a wireless communication system according to still another embodiment of the invention will be described below with reference to FIG. 22. FIG. 22 is a flow chart illustrating a method for use in a wireless communication system according to still another embodiment of the invention.

As illustrated in FIG. 22, the method starts with the step 2200. After the step 2200, the method proceeds to the step 2202.

The step 2202 is a receiving step. In the step 2202, spectrum use information of secondary systems in a first region, which is modified according to reference information is received from the first region, where the reference information is received by the first region from at least some of one or more second regions, and the at least some of the one or more second regions are regions in which primary systems are judged, according to the spectrum use information of the secondary systems in the first region, as being subjected to interference of the secondary systems in the first region.

After the step 2202, the method proceeds to the step 2204.

The step 2204 is an executing step. In the step 2204, communication is performed with user equipments of the secondary systems in the first region according to the modified spectrum use information of secondary systems in the first region.

The method illustrated in FIG. 22 is a method corresponding to the apparatus illustrated in FIG. 18, so a detailed description thereof will be omitted here.

Figure 23:
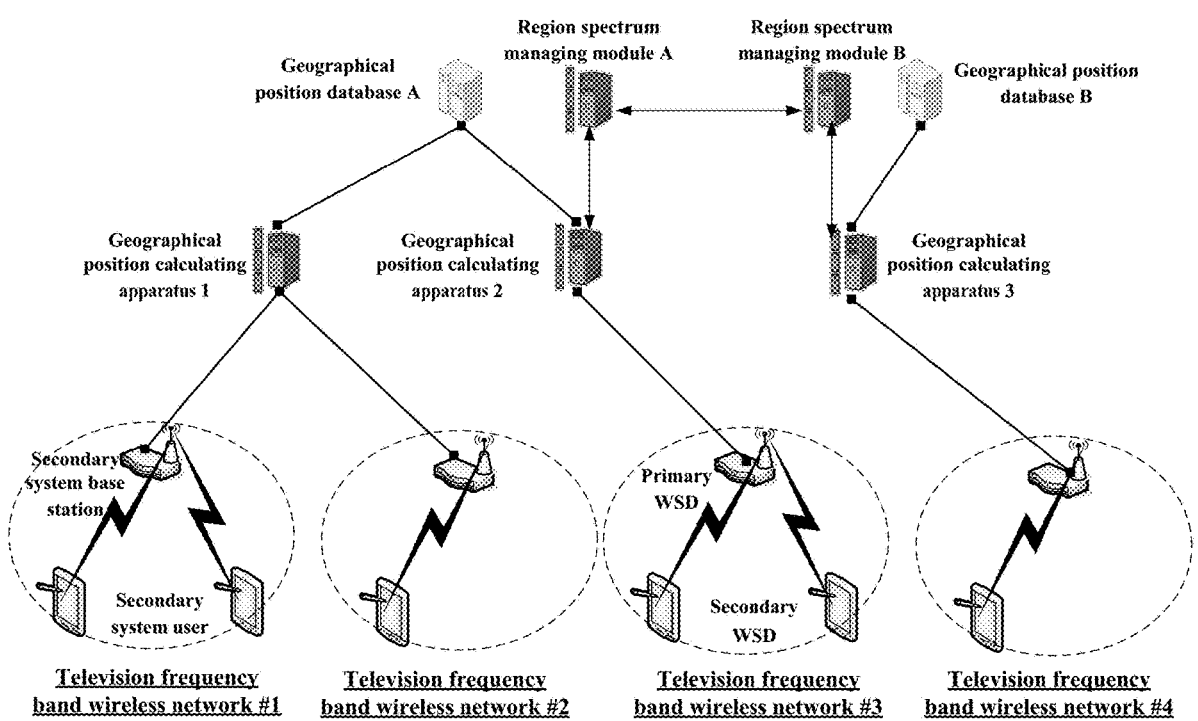
FIG. 23 is a schematic diagram illustrating an application example according to an embodiment of the invention.

An application example according to an embodiment of the invention will be described below with reference to FIG. 23. FIG. 23 is a schematic diagram illustrating an application example according to an embodiment of the invention. The embodiments below are only exemplary and not limited.

As illustrated in FIG. 23, a geographical position database A manages geographical position calculating apparatuses 1 and 2. The geographical position calculating apparatuses 1 and 2 manage television frequency band wireless networks 1, 2 and 3. A television frequency band wireless network 4 is managed by a geographical position calculating apparatus 3. Here the geographical position databases A and B are two adjacent countries or regions. The geographical position calculating apparatuses 1 and 2 are different operators in the same country or region. The geographical position calculating apparatus 3 is an operator of another country.

As specified by the existing European regulations for communication over wireless networks in television frequency bands, a base station of the wireless network firstly transmits its own geographical position information to the geographical position calculating apparatus, and then the geographical position calculating apparatus calculates a spectrum available to the wireless network at the position according to spectrum use information of television and radio networks in the geographical position database. The base station of the wireless network selects a frequency band for wireless communication in the available spectrum and then transmits desired frequency band use information to the geographical position calculating apparatus. Then finalized frequency band use information can be modified according to the desired frequency band use information of the secondary system, so that the television frequency band wireless network 3 will not interfere with the television frequency band wireless networks 1 and 2 in the other country or region.

Moreover an embodiment of the invention further proposes a program product carrying machine executable instructions, where the instructions cause upon being executed on an information processing apparatus the information processing apparatus to perform the method for use in a wireless communication system according to the embodiment of the invention.

Moreover an embodiment of the invention further proposes a storage medium including machine readable program codes, where the program codes cause upon being executed on an information processing apparatus the information processing apparatus to perform the method for use in a wireless communication system according to the embodiments of the invention.

Correspondingly a storage medium carrying the program product with the machine readable instruction codes stored thereon will also come into the scope of this disclosure. The storage medium can include but will not be limited to a floppy disk, an optical disk, an optic-magnetic disk, a memory card, a memory stick, etc.

The apparatus in a wireless communication system according to the embodiments of the invention and the components thereof can be configured in software, firmware, hardware or any combination thereof. A particular configuration means or manner available is well known to those skilled in the art, and a repeated description thereof will be omitted here. In the case of being embodied in software or firmware, programs constituting the software can be installed from a storage medium or a network to a computer with a dedicated hardware structure (e.g., an information processing apparatus 2400 illustrated in FIG. 24), and the computer can perform the various functions when the various pieces of programs are installed thereon.

Figure 24:
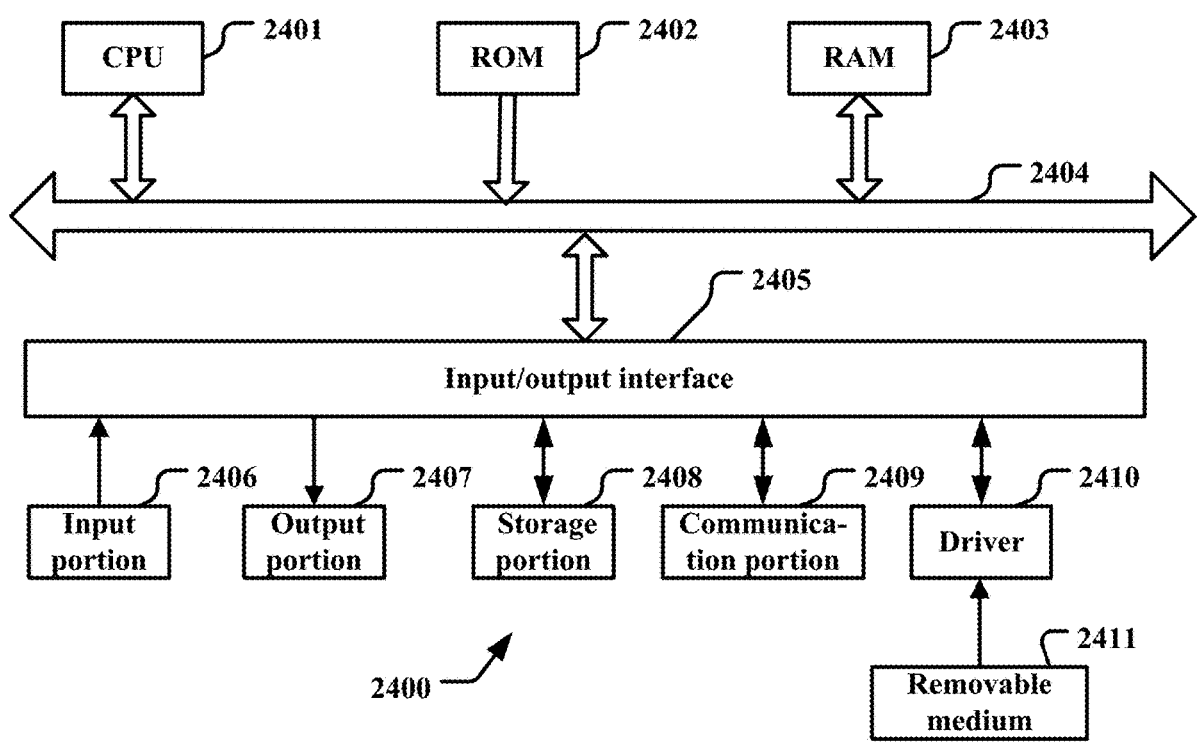
FIG. 24 is a schematic block diagram of an information processing apparatus in which an embodiment of the invention can be embodied.

FIG. 24 is a schematic block diagram of an information processing apparatus in which an embodiment of the invention can be embodied.

In FIG. 24, a Central Processing Unit (CPU) 2401 performs various processes according to programs stored in a Read Only Memory (ROM) 2402 or loaded from a storage portion 2408 into a Random Access Memory (RAM) 2403 in which data required when the CPU 2401 performs the various processes, etc., are also stored as needed. The CPU 2401, the ROM 2402 and the RAM 2403 are connected to each other via a bus 2404 to which an input/output interface 2405 is also connected.

The following components are connected to the input/output interface 2405: an input portion 2406 (including a keyboard, a mouse, etc.), an output portion 2407 (including a display, e.g., a Cathode Ray Tube (CRT), a Liquid Crystal Display (LCD), etc., a speaker, etc.), a storage port 2408 (including a hard disk, etc.), and a communication portion 2409 (including a network interface card, e.g., an LAN card, a modem, etc). The communication portion 2409 performs a communication process over a network, e.g., the Internet. A driver 2410 can also be connected to the input/output interface 2405 as needed. A removable medium 2411, e.g., a magnetic disk, an optical disk, an optic-magnetic disk, a semiconductor memory, etc., can be installed on the driver 2410 as needed so that computer programs fetched therefrom can be installed into the storage portion 2408 as needed.

In the case that the foregoing series of processes are performed in software, programs constituting the software can be installed from a network, e.g., the Internet, etc., or a storage medium, e.g., the removable medium 2411, etc.

Those skilled in the art shall appreciate that such a storage medium will not be limited to the removable medium 2411 illustrated in FIG. 24 in which the programs are stored and which is distributed separately from the apparatus to provide a user with the programs. Examples of the removable medium 2411 include a magnetic disk (including a Floppy Disk (a registered trademark)), an optical disk (including Compact Disk-Read Only memory (CD-ROM) and a Digital Versatile Disk (DVD)), an optic-magnetic disk (including a Mini Disk (MD) (a registered trademark)) and a semiconductor memory. Alternatively the storage medium can be the ROM 2402, a hard disk included in the storage port 2408, etc., in which the programs stored and which is distributed together with the apparatus including the same to the user.

The instruction codes upon being read and executed by a machine can perform the method for use in a wireless communication system according to the embodiments of the invention.

Additionally, the present advancements can be configured as described below.

(1) A spectrum management system, comprising: circuitry configured to obtain interference information from another spectrum management system indicating interference with communication of a communication system managed by the other spectrum management system, the interference being caused by at least one secondary communication system managed by the spectrum management system, and modify a communication characteristic of the at least one secondary communication system based on the interference information.

(2) The spectrum management system of (1), wherein the communication system managed by the other spectrum management system is a primary communication system and the interference information includes information for the primary communication system managed by the other spectrum management system.

(3) The spectrum management system of any one of (1) to (2), wherein the interference information indicates aggregate interference with the communication of the communication system managed by the other spectrum management system, and the circuitry modifies the communication characteristic of the at least one secondary communication system to avoid the aggregate interference, the aggregate interference being an aggregate of interference from the at least one secondary communication system and at least one secondary communication system not managed by the spectrum management system.

(4) The spectrum management system of (3), wherein the interference information includes information for the at least one secondary communication system not managed by the spectrum management system, and the circuitry modifies the communication characteristics based on the information.

(5) The spectrum management system of any one of (1) to (4), wherein the interference information includes identifier information of the at least one secondary communication system, and the circuitry identifies the at least one secondary communication system using the identifier information.

(6) The spectrum management system of any one of (1) to (5), wherein the interference information includes communication characteristic information for the communication characteristic of the at least one secondary communication system, and the circuitry sets the communication characteristic of the at least one secondary communication system using the communication characteristic information.

(7) The spectrum management system of any one of (1) to (6), wherein the circuitry calculates communication characteristic information based on the interference information, and sets the communication characteristic of the at least one secondary communication system using the communication characteristic information.

(8) The spectrum management system of any one of (1) to (7), wherein the circuitry is further configured to store the interference information received from the other spectrum management system in a storage circuit.

(9) The spectrum management system of any one of (1) to (8), wherein the circuitry is further configured to transmit spectrum use information corresponding to the at least one secondary communication system to the other spectrum management system.

(10) A spectrum management system comprising: circuitry configured to identify interference with communication of a communication system managed by the spectrum management system, the interference originating from at least one secondary communication system managed by another spectrum management system, generate interference information based on the identified interference, and provide the interference information to the other spectrum management system.

(11) The spectrum management system of (10), wherein the communication system managed by the spectrum management system is a primary communication system,

(12) The spectrum management system of any one of (10) to (11), wherein the circuitry identifies the interference based on spectrum use information corresponding to the at least one secondary communication system managed by the other spectrum management system.

(13) The spectrum management system of (12), wherein the spectrum use information is received from the other spectrum management system.

(14) The spectrum management system of any one of (12) to (13), wherein the circuitry is further configured to calculate communication characteristic information for the at least one secondary communication system managed by the other spectrum management system, and to transmit the communication characteristic information to the other spectrum management system as part of the interference information, the communication characteristic information including information to modify a communication characteristic of the at least one secondary communication system managed by the other spectrum management system to avoid interference identified.

(15) The spectrum management system of any one of (10) to (14), wherein the circuitry is further configured to determine aggregate interference using the interference identified and spectrum use information of at least one secondary communication system managed by any spectrum management system, and to generate the interference information based on the aggregate interference.

(16) The spectrum management system of (15), wherein the circuitry is further configured to transmit information of the at least one secondary communication system managed by any spectrum management system to the other spectrum management system as part of the interference information.

(17) The spectrum management system of any one of (15) to (16), wherein the circuitry is further configured to calculate communication characteristic information for the secondary communication system managed by the other spectrum management system based on the aggregate interference, and to transmit the communication characteristic information, as part of the interference information, to the other spectrum management system, the communication characteristic information indicating a modification to a communication characteristic of the at least one secondary communication system managed by the other spectrum management system.

(18) The spectrum management system of any one of (10) to (17), wherein the circuitry is further configured to store the interference information in a storage circuit.

(19) A method for spectrum management system, comprising: obtaining, with circuitry of the spectrum management system, interference information from another spectrum management system indicating interference with communication of a communication system managed by the other spectrum management system, the interference being caused by at least one secondary system managed by the spectrum management system, and modifying a communication characteristic of the at least one secondary communication system based on the interference information.

(20) The method according of (19), wherein the communication system managed by the other spectrum management system is a primary communication system. (1) A non-transitory computer-readable medium encoded with computer-readable instructions thereon, the computer readable instructions, when executed by a computer, cause the computer to perform the method of any one of (19) to (20).

(22) A method for a spectrum management system, comprising: identifying, in circuitry of the spectrum management system, interference with communication of a communication system managed by the spectrum management system, the interference originating from a secondary communication system managed by another spectrum management system, generating interference information based on the identified interference, and providing the interference information to the other spectrum management system.

(23) The method for a spectrum management system of (22), wherein the communication system managed by the spectrum management system is a primary communication system.

(24) A non-transitory computer-readable medium encoded with computer-readable instructions thereon, the computer-readable instructions, when executed by a computer, cause the computer to perform the method of any one of (22) to (23).

(25) An apparatus in a wireless communication system, comprising: a receiving unit for receiving, from at least some of one or more second regions, reference information for modifying spectrum use information of secondary systems in a first region, wherein the at least some of the one or more second regions are regions in which primary systems are judged, according to the spectrum use information of the secondary systems in the first region, as being subjected to interference of the secondary systems in the first region; and a managing unit for modifying the spectrum use information of the secondary systems in the first region according to the received reference information.

(26) The apparatus of (25), wherein the spectrum use information comprises at least one of actual spectrum use information and available spectrum information, the available spectrum information of the secondary systems in the first region being determined according to geographical position information of the secondary systems in the first region and service range information of a primary system in the first region.

(27) The apparatus of any one of (25) to (26), wherein the spectrum use information of the secondary systems in the first region comprises at least one of frequency bands, bandwidths, transmission power and spectrum use time.

(8) The apparatus of any one of (25) to (27), wherein the reference information comprises at least one of: service range information of primary systems, in the one or more second regions, subjected to interference of the secondary systems in the first region, and secondary-system-related information of the secondary systems which interfere with primary systems in the one or more second regions.

(29) The apparatus of (28), wherein the spectrum use information of the secondary systems in the first region is modified according to operating condition information of the primary systems, in the one or more second regions, subjected to interference of the secondary systems in the first region, so that the secondary systems in the first region do not interfere with the primary systems in the one or more second regions, wherein the primary systems, in the one or more second regions, subjected to interference of the secondary systems in the first region, are determined according to the service range information of the primary systems in the one or more second regions as well as first level interference range information of the secondary systems in the first region, which is determined based on the spectrum use information of the secondary systems in the first region.

(30) The apparatus of any one of (25) to (29), wherein the at least some of the one or more second regions are regions in which primary systems are judged, according to the spectrum use information of the secondary systems in the first region as well as the spectrum use information of the other secondary systems in the first region and/or the secondary systems in the one or more second regions, as being subjected to aggregated interference of the secondary systems in the first region.

(31) The apparatus of (30), wherein the spectrum use information of the secondary systems in the first region is modified according to the operating condition information of the primary systems, in the one or more second regions, subjected to the aggregated interference of the secondary systems in the first region as well as interference condition information of the secondary systems which interfere with the primary systems, in the one or more second regions, subjected to the aggregated interference of the secondary systems in the first region, so that the secondary systems in the first region do not produce aggregated interference to the primary systems in the one or more second regions, wherein the primary systems, in the one or more second regions, subjected to the aggregated interference of the secondary systems in the first region, are determined according to the service range information of the primary systems in the one or more second regions as well as second level interference range information of the secondary systems in the first region, which is determined based on the spectrum use information of the secondary systems in the first region.

(32) The apparatus of (31), wherein the interference condition information of the secondary systems which interfere with the primary systems, in the one or more second regions, subjected to the aggregated interference of the secondary systems in the first region, is obtained by inquiring about interference condition information, recorded in a registering unit in the second region, to which different positions within a service range of the primary system in the second region are subjected from secondary systems in the second region and from secondary systems in other regions.

(33) The apparatus of (32), wherein the interference condition information from the secondary systems in the second region comprises interference amounts of the secondary systems in the second region to the primary system in the second region and/or spectrum use time of the secondary systems in the second region, and the interference condition information from the secondary systems in the other regions comprises region identifiers of the other regions and secondary system identifiers of the secondary systems in the other regions.

(34) The apparatus of any one of (25) to (33), wherein the managing unit further comprises: a secondary system spectrum use time determining unit for determining spectrum use valid time of the secondary systems in the first region according to a spectrum use time limit of the primary system in the first region and spectrum use time limits of the primary systems, in the one or more second regions, subjected to interference of the secondary systems in the first region.

(35) The apparatus of (34), wherein: the receiving unit is further adapted to receive, from the secondary systems in the first region, secondary system spectrum use durations estimated by the secondary systems in the first region; and the secondary system spectrum use time determining unit is further adapted to modify the spectrum use time of the secondary systems in the first region according to the spectrum use valid time of the secondary systems determined by the secondary system spectrum use time determining unit and the secondary system spectrum use durations.

(36) The apparatus of (35), wherein the secondary system spectrum use durations are estimated according to the spectrum use information of the secondary systems in the first region and application types of the secondary systems in the first region.

(37) The apparatus of any one of (25) to (36), further comprising: a registering unit for recording interference condition information to which different positions within a service range of the primary system in the first region are subjected from the secondary systems in the first region and from secondary systems in other regions.

(38) The apparatus of (37), wherein the interference condition information from the secondary systems in the first region comprises interference amounts of the secondary systems in the first region to the primary system in the first region and/or spectrum use time of the secondary systems in the first region, and the interference condition information from the secondary systems in the other regions comprises region identifiers of the other regions and secondary system identifiers of the secondary systems in the other regions.

(39) The apparatus of any one of (25) to (38), wherein the first region further transmits a region identifier of the first region and secondary system identifiers of the secondary systems in the first region to the one or more second regions.

(40) The apparatus of any one of (25) to (39), further comprising: a storing unit for storing descriptions of transmission masks of secondary systems in the first region and the one or more second regions and corresponding identifiers thereof.

(41) The apparatus of (40), further comprising: a converting unit for converting the identifiers of the transmission masks of secondary systems from the one or more second regions into descriptions of corresponding transmission masks of secondary systems according to the descriptions of the transmission masks or frequency bands of secondary systems in the one or more second regions and the corresponding identifiers thereof, which are stored in the storing unit.

(42) A method for use in a wireless communication system, comprising: a receiving step of receiving, from at least some of one or more second regions, reference information for modifying spectrum use information of secondary systems in a first region, wherein the at least some of the one or more second regions are regions in which primary systems are judged, according to the spectrum use information of the secondary systems in the first region, as being subjected to interference of the secondary systems in the first region; and a managing step of modifying the spectrum use information of the secondary systems in the first region according to the received reference information.

(43) An apparatus in a wireless communication system, comprising: an acquiring unit for acquiring spectrum use information of secondary systems in a first region; a managing unit for judging, according to the spectrum use information of the secondary systems in the first region, whether the secondary systems in the first region interfere with a primary system in a second region; and a transmitting unit for transmitting reference information for modifying the spectrum use information of the secondary systems in the first region to the first region in the case that the secondary systems in the first region interfere with the primary system in the second region.

(44) The apparatus of (43), wherein the reference information comprises at least one of service range information of the primary system, in the second region, subjected to interference of the secondary systems in the first region, and secondary-system-related information of the secondary systems which interfere with the primary system in the second region.

(45) The apparatus of (44), wherein the primary system, in the second region, subjected to the interference of the secondary systems in the first region is searched for according to the service range information of the primary system in the second region as well as first level interference range information of the secondary systems in the first region, which is determined based on the spectrum use information of the secondary systems in the first region, wherein the spectrum use information of the secondary systems in the first region is modified according to operating condition information of the primary system, in the second region, subjected to interference of the secondary systems in the first region, so that the secondary systems in the first region do not interfere with the primary system in the second region.

(46) The apparatus of any one of (43) to (45), wherein the managing unit is further adapted to judge, according to the spectrum use information of the secondary systems in the first region as well as spectrum use information of other secondary systems in the first region and/or secondary systems in one or more second regions, whether the secondary systems in the first region produce aggregated interference to the primary system in the second region.

(47) The apparatus of (46), wherein the primary system, in the second region, subjected to aggregated interference of the secondary systems in the first region is searched for according to the service range information of the primary system in the second region as well as second level interference range information of the secondary systems in the first region, which is determined based on the spectrum use information of the secondary systems in the first region, wherein the spectrum use information of the secondary systems in the first region is modified according to operating condition information of the primary system, in the second region, subjected to aggregated interference of the secondary systems in the first region as well as interference condition information of secondary systems which interfere with the primary system, in the second region, subjected to aggregated interference of the secondary systems in the first region, so that the secondary systems in the first region do not produce aggregated interference to the primary system in the second region.

(48) The apparatus of (47), wherein the interference condition information of the secondary systems which interfere with the primary system, in the second region, subjected to aggregated interference of the secondary systems in the first region, is obtained by inquiring about interference condition information, recorded in a registering unit in the second region, to which different positions within a service range of the primary system in the second region are subjected from secondary systems in the second region and from secondary systems in other regions.

(49) The apparatus of (48), wherein the interference condition information from the secondary systems in the second region comprises interference amounts of the secondary systems in the second region to the primary system in the second region and/or spectrum use time of the secondary systems in the second region, and the interference condition information from the secondary systems in the other regions comprises region identifiers of the other regions and secondary system identifiers of the secondary systems in the other regions,

(50) The apparatus of any one of (43) to (49), wherein the acquiring unit further acquires a region identifier of the first region and secondary system identifiers of the secondary systems in the first region.

(51) The apparatus of any one of (43) to (50), further comprising: a registering unit for recording interference condition information to which different positions within a service range of the primary system in the second region are subjected from the secondary systems in the second region and from secondary systems in other regions.

(52) The apparatus of (51), wherein the interference condition information from the secondary systems in the second region comprises interference amounts of the secondary systems in the second region to the primary system in the second region and/or spectrum use time of the secondary systems in the second region, and the interference condition information from the secondary systems in the other regions comprises region identifiers of the other regions and secondary system identifiers of the secondary systems in the other regions.

(53) The apparatus of any one of (43) to (52), further comprising: a storing unit for storing descriptions of transmission masks of secondary systems in the first region and the second region and corresponding identifiers thereof.

(54) A method in a wireless communication system, comprising: an acquiring step of acquiring spectrum use information of secondary systems in a first region; a managing step of judging, according to the spectrum use information of the secondary systems in the first region, whether the secondary systems in the first region interfere with a primary system in a second region; and a transmitting step of transmitting reference information for modifying the spectrum use information of the secondary systems in the first region to the first region in the case that the secondary systems in the first region interfere with the primary system in the second region.

(55) An apparatus in a wireless communication system, comprising: a receiving unit for receiving, from a first region, spectrum use information of secondary systems in the first region, which is modified according to reference information, wherein the reference information is received by the first region from at least some of one or more second regions, and the at least some of the one or more second regions are regions in which primary systems are judged, according to the spectrum use information of the secondary systems in the first region, as being subjected to interference of the secondary systems in the first region; and an executing unit for communicating with user equipments of the secondary systems in the first region according to the modified spectrum use information of secondary systems in the first region.

(56) The method of (54), further comprising: a secondary system spectrum use duration estimating unit for estimating secondary system spectrum use durations according to the spectrum use information of the secondary systems in the first region and application types of the secondary systems in the first region.

(57) The method of (56), further comprising: a transmitting unit for transmitting the estimated secondary system spectrum use durations to the first region.

(58) The method of any one of (54), (56) and (57), further comprising: a secondary system spectrum use time modifying unit for modifying spectrum use of the secondary systems in the first region according to changes in spectrum use conditions of the primary system and the secondary systems in the first region within the secondary system spectrum use durations or spectrum available time limits.

(59) A method for use in a wireless communication system, comprising: a receiving step of receiving, from a first region, spectrum use information of secondary systems in the first region, which is modified according to reference information, wherein the reference information is received by the first region from at least some of one or more second regions, and the at least some of the one or more second regions are regions in which primary systems are judged, according to the spectrum use information of the secondary systems in the first region, as being subjected to interference of the secondary systems in the first region; and an executing step of communicating with user equipments of the secondary systems in the first region according to the modified spectrum use information of secondary systems in the first region.

As can be appreciated, those ordinarily skilled in the art can make numerous modifications and variations without departing from the scope and spirit of the invention. The embodiments have been selected and described for the purpose of best explaining the principle and practical applications of the invention to enable those ordinarily skilled in the art to appreciate the invention in various embodiments with various changes suited to particular use as contemplated.

What is claimed is:

1. A secondary communication system that has resources coordinated by a spectrum management system with a first communication system, comprising:
   circuitry configured to
   provide spectrum use information to the spectrum management system, the spectrum use information includes information indicating a spectrum use condition of the secondary communication system and indicates that the secondary communication system is authorized to utilize resources from the first communication system when the resources of the first communication system are not in use;
   receive determined communication characteristic information of the secondary communication system from the spectrum management system; and
   determine the spectrum use of the secondary communication system based on the determined communication characteristic information.

2. The secondary communication system according to claim 1, wherein the spectrum use information includes at least one of available frequency bands, available bandwidths, maximum transmission power and spectrum valid use time, geographical position information, and distance between the secondary communication system and the first communication system.

3. The secondary communication system according to claim 1, wherein the secondary communication system is located in a second region.

4. The secondary communication system according to claim 1, wherein a primary communication system is located in a first region.

5. A spectrum management system that coordinates resources between a first communication system and a secondary communication system, comprising:
   circuitry configured to identify interference information of the secondary communication system, the secondary communication system configured to be managed by the spectrum management system;

provide the interference information to another spectrum management system;

receive a determined interference response from the other spectrum management system; and determine a communication characteristic of the secondary communication system based on the determined interference response, wherein the circuitry identifies the interference based on spectrum use information corresponding to the secondary communication system, and the spectrum use information indicates that the secondary communication system is authorized to utilize resources from the first communication system when the resources of the first communication system are not in use.

6. The spectrum management system according to claim 5, wherein the interference information indicates aggregate interference, the aggregate interference being an aggregate of interference from the secondary communication system, and the circuitry determines the communication characteristic of the secondary communication system to reduce the aggregate interference.

7. The spectrum management system according to claim 5, wherein the interference information includes information for another secondary communication system not managed by the spectrum management system, and the circuitry determines the communication characteristics based on the information for the other secondary communication system not managed by the spectrum management system.

8. The spectrum management system according to claim 5, wherein the interference information includes identifier information of the secondary communication system, and the circuitry identifies the secondary communication system using the identifier information.

9. The spectrum management system according to claim 5, wherein the interference information includes communication characteristic information for the secondary communication system, and the circuitry sets the communication characteristic of the secondary communication system using the communication characteristic information.

10. The spectrum management system according to claim 5, wherein the circuitry:

calculates communication characteristic information based on the interference information; and sets the communication characteristic of the secondary communication system using the communication characteristic information.

11. The spectrum management system according to claim 5, wherein the circuitry is further configured to transmit interference information of one or more secondary communication systems managed by any spectrum management system to the other spectrum management system.

12. A method performed by a spectrum management system of coordinating resources between a first communication system and a secondary communication system, the method comprising:

identifying interference information of the secondary communication system, the secondary communication system configured to be managed by the spectrum management system;

providing the interference information to another spectrum management system;

receiving a determined interference response from the other spectrum management system;

determining a communication characteristic of the secondary communication system based on the determined interference response; and identifying the interference based on spectrum use information corresponding to the secondary communication system, wherein the spectrum use information indicates that the secondary communication system is authorized to utilize resources from the first communication system when the resources of the first communication system are not in use.

* * * * *